United States Patent
Austin et al.

(10) Patent No.: US 6,222,673 B1
(45) Date of Patent: *Apr. 24, 2001

(54) GROUP-DELAY-DISPERSIVE MULTILAYER-MIRROR STRUCTURES AND METHOD FOR DESIGNING SAME

(75) Inventors: R. Russel Austin, Novato; R. Ian Edmond, Meadow Vista, both of CA (US)

(73) Assignee: Coherent, Inc., Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/135,972

(22) Filed: Aug. 18, 1998

(51) Int. Cl.$^7$ .............................. G02B 1/10; G02B 8/28; H01S 3/081; H01S 3/08

(52) U.S. Cl. .................... 359/584; 359/586; 359/588; 359/589; 372/93; 372/99

(58) Field of Search ..................... 359/584, 586, 359/587, 588, 589; 372/93, 99

(56) References Cited

U.S. PATENT DOCUMENTS

| | | | |
|---|---|---|---|
| 3,528,726 | 7/1969 | Austin | 350/166 |
| 4,756,602 | 7/1988 | Southwell et al. | 350/166 |
| 5,734,503 | 3/1998 | Szipócs et al. | 359/584 |

FOREIGN PATENT DOCUMENTS

| | | | |
|---|---|---|---|
| 2-23302 | 7/1988 | (JP) | G02B/5/08 |

OTHER PUBLICATIONS

Paolo Laporta, et al., "Dispersive effects in the reflection of femtosecond optical pulses from broadband dielectric mirrors," *Applied Optics*, vol. 24, No. 13, Jul. 1, 1985, pp. 2014–2020.

Jürgen Kuhl, et al., "Compression of Femtosecond Optical Pulses with Dielectric Multilayer Interferometers," *IEEE Transactions on Quantum Electronics*, vol. QE–22, No. 1, Jan. 1986, pp. 182–185.

Nicolai Matuschek, et al., "Theory of Double–Chirped Mirrors," *IEEE Journal of Selected Topics in Quantum Electronics*, vol. 4, No. 2, Mar./Apr. 1998, pp. 197–208.

R. Szipócs, "Theory and design of dispersive dielectric high reflectors for femtosecond pulse laser systems," *Proceedings the OSA Conference on Optical Interference Coatings*, Jun. 7–12, 1998, Tucson, AZ, pp. 290–292.

(List continued on next page.)

*Primary Examiner*—Cassandra Spyrou
*Assistant Examiner*—Audrey Chang
(74) *Attorney, Agent, or Firm*—Limbach & Limbach L.L.P.

(57) ABSTRACT

Negative Group-delay-dispersion mirror (NGDD-mirror) multilayer structures include a generally-orderly arrangement of layers or groups of layers in which the function of certain individual layers or groups of layers can be recognized and defined. The structures are broadly definable as a rear group of layers which are primarily responsible for providing a desired reflection level and reflection bandwidth together with a low and smoothly varying reflection phase-dispersion, and a front group of layers which are primarily responsible for producing high reflection phase-dispersion necessary for providing a desired NGDD level and bandwidth. The front group of layers relies on multiple resonant trapping mechanisms such as two or more effective resonant-cavities, employing one or more sub-quarter-wave layers to shape the phase-dispersion for providing a substantially-constant NGDD. In certain embodiments of the structures, a base layer or substrate of a highly-reflective metal can be used to reduce the number of dielectric layers needed to provide high reflectivity.

18 Claims, 18 Drawing Sheets

OTHER PUBLICATIONS

A. V. Tikhonravov, et al., "To the design and theory of chirped mirrors," Proceedings the OSA Conference on Optical Interference Coatings, Jun. 7–12, 1998, Tucson, AZ, pp. 293–295.

N. Matuschek, et al., "Design of broadband double–chirped mirrors for the generation of sub–10 fs laser pulses," Proceedings the OSA Conference on Optical Interference Coatings, Jun. 7–12, 1998, Tucson, AZ, pp. 296–298.

International Search Report –PCT.

D. Kopf, et al., "All–in–one Dispersion–compensating Saturable Absorber Mirror for Compact Femtosecond Laser Sources," *Optical Society of America* vol. 17, No. 22, Nov. 15, 1992.

J. M. Jacobson, et al., "Femtosecond Pulse Generation In A Ti:$Al_2O_3$ laseBy Second–and Third–order Intracavity Diuspersion"*Optical Society of America* vol. 17, No. 22, Nov. 15, 1992.

Andreas Stingl, et al., "Generation of 11–Fs Pulses From a Ti:sapphire Laser Without The Use Of Prims" *Optical Society of America* vol. 19, No. 3, Feb. 1, 1994.

REFLECTANCE (%) AND PHASE SHIFT ON REFLECTION (DEG)
vs WAVELENGTH (nm)

REFLECTANCE (%) AND PHASE SHIFT ON REFLECTION (DEG)
vs WAVELENGTH (nm)

GROUP-DELAY-DISPERSIVE MULTILAYER-MIRROR STRUCTURES AND METHOD FOR DESIGNING SAME

TECHNICAL FIELD OF THE INVENTION

The present invention relates to generally to multilayer mirrors having controlled phase-dispersion. It relates in particular to multiple resonant multilayer structures having phase-dispersion arranged to provide a predetermined negative group-delay-dispersion for pulsed radiation incident thereon, particularly ultrafast laser pulses.

DISCUSSION OF BACKGROUND ART

Ultrafast lasers generate a series of short optical pulses. Temporal separation of the pulses is determined by a round-trip time of light circulating in the resonant-cavity of the laser. If a high energy-per-pulse or high pulse-separation time is required, it is desirable to operate the laser with as long a resonant-cavity as possible.

Unfortunately, in many applications of ultrafast lasers, such as incorporating the laser in a small instrument, a laser having a cavity length of about 2 m or more is simply not practical. A practical length is about thirty centimeters (cm) or less. In certain applications, a length of 10 cm may be desirable. To "fold" a 2 m long cavity, using multiple reflections, in order to obtain a 10 cm longest physical dimension would require more than twenty reflections, accordingly minimizing reflection losses is important.

In most ultrafast lasers, a cavity loss in excess of 1.0% would lead to significant loss of output power. By way of example, in an ultrafast laser having 10% outcoupling, a 1% cavity loss (per round-trip) equates to about 10% loss of output power. Because of this, even if 99.9% reflecting fold-mirrors were used, more than about ten intra-cavity reflections therefrom per round-trip would produce significant output-power reduction.

Further, in order to support the ultrashort pulse length characteristic of an ultrafast laser, the laser must possess a total negative group-delay-dispersion, (negative GDD or NGDD) i.e., the sum of the GDD of the laser gain-medium and all cavity components must be negative. In a simple arrangement of a laser cavity and dielectric material therein, such as, a gain medium and a mode locking device, total cavity GDD would be positive, i.e., shorter wavelength light experiences a higher refractive index and lower group velocity, and lags behind longer wavelength light. This causes lengthening of a laser pulse each round trip and prevents stable, short-pulse operation.

One means of avoiding this is to include one or more NGDD devices having collective negative GDD at least equal to, and preferably greater than, this positive GDD. Furthermore, if the laser is to be tunable over a range of wavelengths, the NGDD devices must be effective over that range of wavelengths.

Reflective NGDD devices which have been used with prior-art ultrafast lasers include Gires-Tournois Interferometer (GTI) mirrors. A GTI-mirror is a multilayer NGDD-mirror including a reflector, which comprises a stack of alternating high and low refractive index dielectric layers, each layer generally having an optical thickness of one-quarter wavelength (one QWOT) at the nominal operating wavelength of the laser, and a single, thick, Fabry-Perot-like "spacer" layer (typically many wavelengths thick) of a dielectric material deposited on the reflector. A partially-reflecting multilayer stack may (optionally) be deposited on the spacer layer. A GTI-mirror typically gives a constant negative GDD over only a relatively narrow wavelength range, for example, about fifty nanometers (nm). In a GTI-mirror, the NGDD is achieved by selective resonant trapping of certain wavelengths in the spacer layer. Such a device is described extensively in a paper "Compression of Femto Second Optical Pulses with Dielectric Multilayer Interferometers", Kuhl et al., IEEE Transactions in Quantum Electronics, QE-22, 1, pp 182–185, (January 1986).

In U.S. Pat. No. 5,734,503 (Szipocs et al.) multilayer NGDD mirrors described as "chirped mirrors" are disclosed. One disclosed example of such a mirror includes a substrate having a structure of more than 40 layers deposited thereon. In this structure, essentially no two adjacent layers have the same optical thickness. Two materials are used for adjacent layers, one having a relatively high refractive index and the other a relatively low refractive index. Throughout the structure, the optical thickness between adjacent layers is substantial, with optical thickness ratios up to about 2:1 not being uncommon. The thickness of individual layers is computer generated (optimized) from an initial layer system described as "intuitive". Increasing individual layers in thickness from the front to the back of the layer system, i.e., from the outermost layer towards the substrate, or a fourier transform design is suggested, although no detail of such an initial layer system is disclosed.

It is taught that, following optimization, apart from a trend of increasing optical thickness of a "reflective period" from the front to the back of the layer system, the layer system does not have any orderly structure. It is taught that nearly-constant NGDD is achieved without the use of resonant trapping mechanisms in the structure, and results simply from different penetration depths of different wavelengths into the structure. Such a mirror appears to be able to provide constant NGDD over a broader band of wavelengths than a GTI-mirror, for example, up to about 150 nm, at a nominal center wavelength of about 800 nm, for a GDD of −45 fs$^2$.

While the Szipocs et al. NGDD-mirror appears to achieve a desired value of nearly-constant NGDD over a bandwidth greater than has been achieved in devices of the GTI type which rely on a wide resonant-cavity to provide NGDD, it would appear from consideration of optical multilayer theory that the mirror structure is far from that which would produce the highest possible reflectivity over the broadest bandwidth with the same number of layers of the same materials.

It is well-known to designers of multilayer optical devices that the highest reflectivity that can be obtained with a group of layers having alternately high and low refractive index is achieved when all layers in the group have the essentially the same optical thickness (an optical thickness ratio of 1:1). Essentially, here meaning to the extent that is achievable considering refractive index dispersion in the materials. Departures from the 1:1 ratio will result in a lower reflectivity over a narrower bandwidth. The greater the departure the lower the reflectivity.

It would be advantageous to provide multilayer structures which achieved comparable NGDD to the Szipocs et al. structures over the same or broader bandwidth, while preserving sufficient order in the structures that the magnitude and bandwidth of reflectivity were not unduly compromised by any structural mechanisms or features necessary to provide that NGDD. The present invention provides such structures and methods for designing them.

SUMMARY OF THE INVENTION

The present invention is directed to providing a multilayer mirror structure for providing greater than a selected high reflectivity value and substantially-constant or nearly-constant negative group-delay-dispersion over a selected band-of wavelengths. This is achieved, not by seeking to eliminate or avoid resonant trapping in the structure, but to provide an arrangement of layers in the front of the structure which intentionally causes selective resonant trapping of certain wavelengths within the selected band of wavelengths to occur. This selective resonant trapping occurs in two or more spaced apart subgroups of layers in that arrangement.

In one aspect, the present invention comprises a substrate having a multilayer structure disposed thereon. The multilayer structure includes first and second pluralities of layers, the second plurality of layers being furthest from the substrate.

The first plurality of layers functions primarily to provide the required high reflectivity value. The second plurality of layers functions primarily to provide a high reflection phase-dispersion for the mirror within the selected band of wavelengths and, cooperative with the first plurality of layers, to provide that the reflection phase-dispersion of the mirror constantly increases over the selected band of wavelengths from about the shortest to about the longest wavelength thereof, in a way which provides substantially constant negative group-delay-dispersion across the band of wavelengths.

The reflective-phase-dispersion-controlling function of the second plurality of layers is effected by arranging the layers such that selective resonant trapping of certain wavelengths within the selected band of wavelengths occurs in at least two longitudinally spaced-apart cavity groups of one or more layers within the second plurality of layers. High phase-dispersion in the this context is understood to be a phase-shift on reflection difference between shortest and longest wavelengths in the selected band of wavelengths of at least 180° (π).

In another aspect of the present invention, the first plurality of layers can be arranged as essentially a quarter-wave stack of alternating layers of two different transparent dielectric materials. The term essentially, here, means, for example, that there may be a terminal layer having less than one quarter-wavelength optical thickness or that there is a minor variation, for example about ±10% of some average value, in the layers. By way of example, such a thickness variation can be somewhat random in nature and exist as a result of computer optimization adjustments that have been found ineffective according to the optimization algorithm and not subsequently reset. The variation may be more orderly and progressive in layers adjacent the second plurality of layers. This may be done for forming an interface between the first and second pluralities of layers.

Such a stack has a bandwidth about equal to or slightly less than about a corresponding "normal" reflection bandwidth. A "normal" bandwidth, here, being defined as the bandwidth of a well-known quarter-wave stack of two different transparent dielectric materials wherein each of the layers is about one QWOT at some so-called center-wavelength. As a quarter-wave stack provides a frequency-symmetrical spectral-response, the so-called center-wavelength is actually not centrally located in the reflection band in wavelength terms, but is that wavelength which is at the frequency-midpoint of the reflection band.

In yet another aspect of the present invention, the first plurality of layers may also be arranged as a broad-band mirror which, here, refers to a mirror having a reflection bandwidth broader than the corresponding "normal" bandwidth discussed above. An important characteristic of the broad-band mirror is that it has a minimum reflection phase-dispersion over the selected bandwidth, preferably less than about 90° (π/2) and more preferably about 60° (π/3) or even less. This, of course refers to the phase-dispersion on a stand alone basis, i.e., without the second plurality of layers, and seen in the intended direction of use of the complete inventive NGDD-mirror. An exactly-zero phase-dispersion is not necessary, and, in the context or the present invention, may not even be practical or possible. The form of what reflection phase-dispersion does exist should be smoothly and monotonically varying, meaning that, within the selected band of wavelengths it should be free of ripples, abrupt changes of slope, changes of sign of the slope, discontinuities, singularities or the like.

The first plurality of layers defines the width over which high reflectivity in the inventive NGDD-mirrors can be obtained. As the highly phase-dispersive multiple-resonant second plurality of layers provides a high reflectivity only at shorter wavelengths in the selected band of wavelengths, and, further, has a highest reflectivity which may be an order of magnitude or more lower than that of the highest reflectivity value of the first plurality of layers, it merely supplements the reflectivity in that band. The first plurality of layers, arranged as discussed above, defines the maximum possible bandwidth over which a particular value of nearly-constant NGDD can be provided by the multiple-resonant second plurality of layers arranged thereon. Short and long wavelength limits are imposed by abrupt changes in phase-dispersion preceding (at the short wavelength limit) and following (at the long wavelength limit) the above-described smooth variation of phase-dispersion at a relatively low level. Typically, the reflection phase-dispersion (slope) gradually decreases from the short wavelength limit to an "effective center-wavelength" and then gradually increases from that "effective center-wavelength". Considered another way, the reflection phase-dispersion of the first plurality must (seen from the direction of use, i.e., from the "front" of the mirror or the intended direction of incidence for radiation) be similar in form to the reflection phase-dispersion of a hypothetical "quarter-wave stack" having the same reflection bandwidth. Seen from the "rear" of the mirror, the reflection phase-dispersion may have a complex form including rapid changes through one or more cycles of 360° (2 π).

In yet another aspect of the present invention, the second plurality of layers is arranged with at least two spaced-apart groups or sub-structures of one or more layers. Each group provides, about those layers, the effect of a resonant-cavity for certain wavelengths in the selected band of wavelengths. The resonant-cavities can be formed, for example, by an effect similar to the so-called index-conjugate or phase-conjugate effect, about a junction between (juxtaposition of) a high refractive index layer and a low refractive index layer, each thereof having a similar thickness significantly less than a quarter-wavelength at a wavelength in the selected band of wavelengths. While such a sub-structure does not include a layer having an optical thickness of one-half wavelength or more at a comparable wavelength which could be defined as forming a "Fabry-Perot type" resonant-cavity, the resonant effect and accompanying amplification of electric-field intensity are essentially the same. This resonant effect is necessary to achieve the NGDD specification of the inventive GDD mirrors within the limits imposed by the first plurality of layers on which it is superposed.

The index-conjugate and other sub-quarter wavelength resonance-forming sub-structures of one or more layers are discussed in detail further below. One or more of the resonant sub-structures may even be a Fabry-Perot type structure centered on a layer having an optical thickness of about one-half wavelength in the reflection bandwidth of interest. Whatever the form of the resonant substructures, their effective quality as resonators or "Q" is determined by the number of layers between the structures and the refractive index ratio of the layers.

It is emphasized here, that while resonant sub-structures arranged around layers less than one quarter-wavelength optical thickness are preferred over half-wavelength or Fabry-Perot structures in NGDD-mirrors in accordance with the present invention, this is because the more complex structure with thinner layers and multiple optical-boundaries is believed to provide a more flexible and smoother phase control. It is very definitely not because of any desire to eliminate or avoid Fabry-Perot type resonances as has been taught in the prior art to be necessary. As noted above, while the sub-quarter-wavelength-layer-based resonant structures are physically different from Fabry-Perot type structures, the resonant effect is similar to Fabry-Perot resonance and is necessary in NGDD-mirror structures in accordance with the present invention. Appropriate arrangement of the number and spacing of these resonant substructures in the second plurality of layers defines the magnitude of the nearly-constant NGDD, and also establishes, within limits imposed by the form of the first plurality of layers, the bandwidth over which the nearly-constant NGDD is obtained.

A preferred method of a multilayer mirror structure design in accordance with the present invention, the method comprises: entering into a suitably-programmed computer a starting structure including a first portion thereof adjacent the substrate and arranged to provide the high reflectivity over at least a portion of the selected band of wavelengths, and a second portion thereof superposed on the first portion thereof and including at least two spaced-apart sub-structures for providing selective resonant trapping of wavelengths within the selected band of wavelengths; and then automatically optimizing, via the computer program, at least the thickness of layers of the starting structure and thereby providing the multilayer mirror structure design. Some preferred examples of starting structures are discussed in detail hereinbelow.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain the principles of the invention.

DETAILED DESCRIPTION OF THE INVENTION

Figure 1:
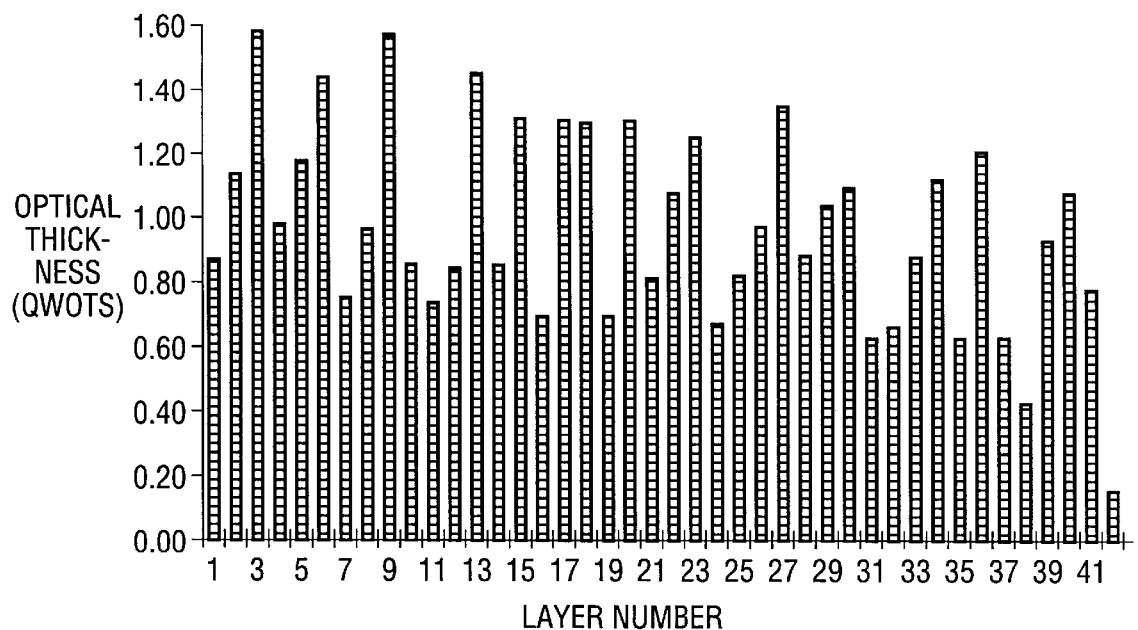
FIG. 1 is a bar graph schematically illustrating a prior-art, chirped-mirror layer structure for providing a constant GDD of about −45 fs$^2$ over a bandwidth between about 730 nm and 830 nm.
Figure 2:
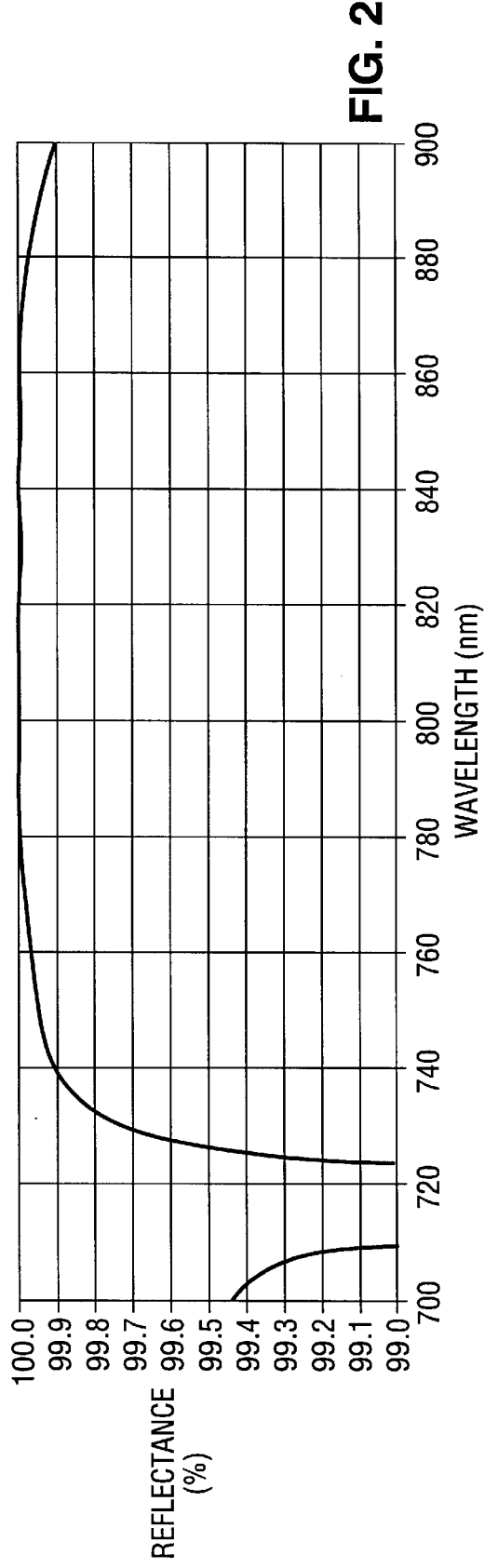
FIG. 2 is a graph schematically illustrating the computed reflection as a function of wavelength for the structure of FIG. 1.
Figure 3:
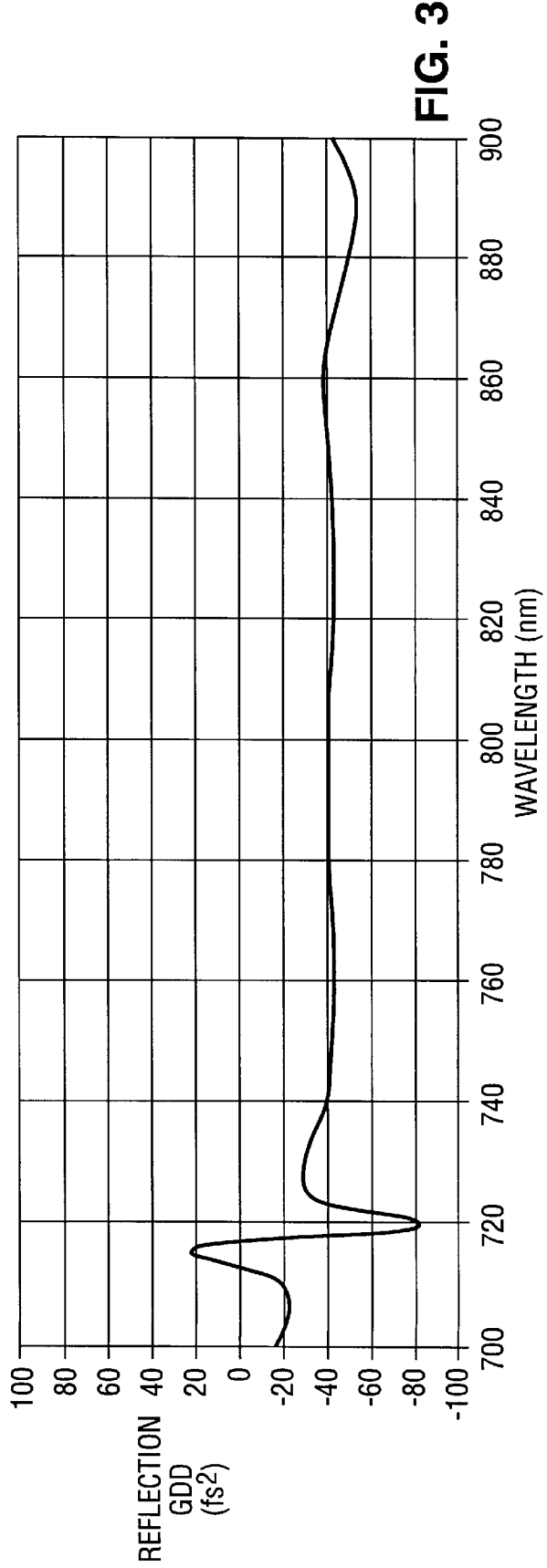
FIG. 3 is a graph schematically illustrating the computed reflection-GDD as a function of wavelength for the structure of FIG. 1.

Turning now to the drawings, FIG. 1 illustrates, in bar graph form, a NGDD-mirror structure according to above discussed teachings of Szipocs et al. Each layer is shown as a vertical bar having a height proportional to its optical thickness. A value of 1.0 is a quarter-wave optical thickness or QWOT (at a wavelength of 790 nm in computations and results discussed below). These optical thicknesses are taken from Table 4 of the Szipocs et al. patent, that being an example of the disclosed "chirped-mirror". The layers are assumed to have high and low refractive indices of 2.31 and 1.45 respectively. There are 42 layers, the substrate being at the origin of the graph of FIG. 1, the first layer (on the substrate) being a low refractive index layer, layers alternating high and low refractive index thereafter. It was decided to use this prior-art structure as a comparison structure for an initial test of an NGDD-mirror structure in accordance with the present invention as follows. The purpose of this test was to demonstrate the important and advantageous function of resonant mechanisms in an NGDD layer structure First, the reflection phase-angle (phase-shift on reflection) as a function of wavelength for the structure of Table 1 was computed using a commercially available software, TFCalc™ from Software Spectral Inc., of Portland, Oreg. Reflectance and reflection-GDD of the structure, as functions of wavelength, were computed using MACLEOD™ software available from The Thin Film Center, of Tucson Ariz. The results are depicted in FIG. 2 and FIG. 3 respectively. Those skilled in the art will be aware that the NGDD is the second differential with respect to frequency of the reflection phase-angle.

Next, an initial structure in accordance with the present invention was loaded into the software. The structure was as follows.

$$\text{Substrate } (H/2 \; L \; H/2)^{15} (L/2 \; H \; L/2)^2 (H/2 \; L \; H/2)^2 \tag{1}$$

where H and L represent one-quarter wavelength optical thickness or QWOT of respectively high and low refractive index material, by which convention, H/2 and L/2 represent one-eighth wavelength optical thicknesses. Layers within parentheses are designated a group, and the superscript outside the parentheses is designated a group-repetition number. This convention and minor variations thereof, (linguistic or decimal, for example), are well known to those skilled in the art. The brief description above is offered for guidance in following structural examples of the present invention presented below.

Structure (1) is a 41 layer structure, adjacent eighth-wave layers of the same refractive index being consolidated to form a QWOT layer. H and L are assumed to have the same index values (2.31 and 1.45) of the prior-art structure of FIG. 1.

Adjacent layers (pairs) 31 and 32, and 36 and 37 (numbering from the substrate) are eighth-wavelength optical thickness layers of different refractive index. The structure causes resonance (selective resonant trapping) for certain wavelengths in the regions of these eighth-wave layer pairs. The resonance mechanism is based on what is known variously as a phase-conjugate or index-conjugate mechanism, the latter being a more accurate description. It is described in detail in U.S. Pat. No. 3,528,726, where its use for making narrow bandpass-filters is disclosed. Briefly, a structure:

$$(L/2 \; H \; L/2)^n (H/2 \; L \; H/2)^n \tag{2}$$

represented as a 2×2 matrix, is a unit matrix for some wavelength longer than the QWOT (center) wavelength of the layers. Each group has a dispersive, entirely-imaginary effective-refractive-index (effective-index) within some bandwidth defined by the high and low refractive index values of H and L. The effective-indices of each group extend through the same range of magnitude but are opposite in sign and slope. A unit matrix is derived at a wavelength where the effective-indices are conjugate. Resonance is a maximum at this conjugate wavelength. A Fabry-Perot resonant-cavity is represented by a unit matrix at a wavelength at which it is an integer multiple of half-wavelengths (twice that multiple of QWOTs) thick. We may describe structure (2) as forming a virtual-cavity, effective-cavity or "conjugate-cavity" to differentiate from the "real" (structurally obvious) cavity of a Fabry-Perot etalon or GTI. It should be noted, here, that structure (2) is a particular case of a more general structure $(aH \; bL \; aH)^n (aL \; bH \; aL)^n$, where 2a+b=2, which also provides for resonance according to the same principle.

Continuing now with a discussion of initial structure (1), this initial structure was computer-optimized to match the reflection phase-shift as a function of wavelength computed for the Szipocs et al. structure of FIG. 1. Optimization targets were set in the range between 730 nm to 870 nm. On the assumption that if this phase function were reproduced, so would be the NGDD as a function of wavelength at lest in that wavelength range. The optimization method was the "variable metric" method. It should be noted in particular, that, all layers were allowed to be variable in the optimization, and optimization was a single-parameter, phase-only optimization (reflection was not optimized).

Figure 4:
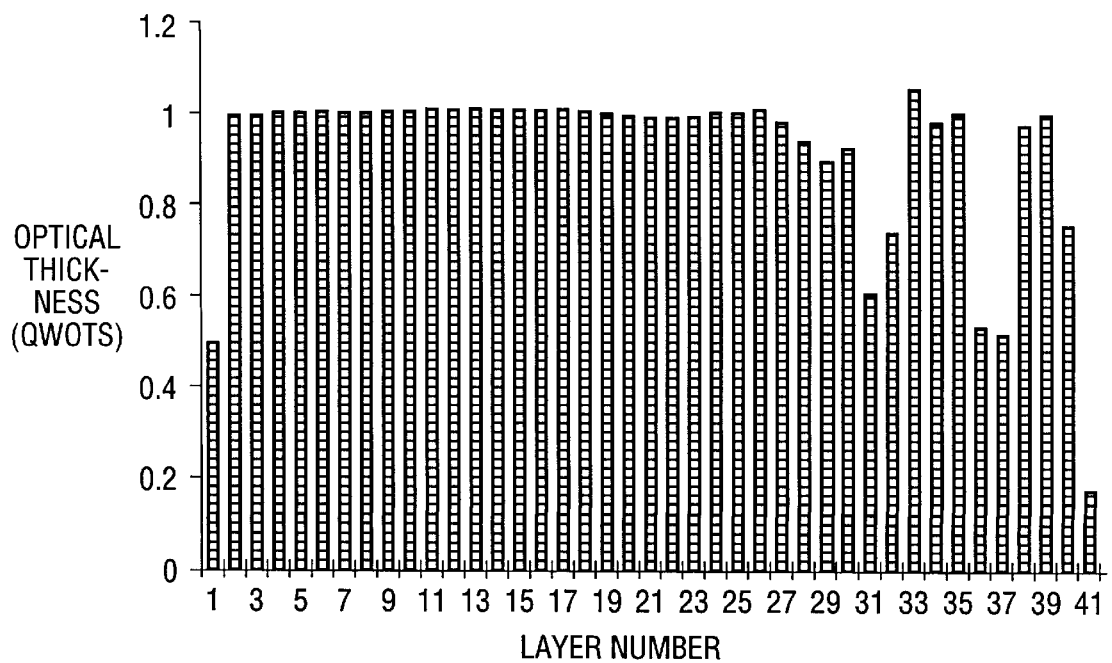
FIG. 4 is a bar graph schematically illustrating one example of an NGDD-mirror layer structure in accordance with the present invention for providing a substantially constant NGDD of about −45 fs$^2$ and greater than 99.99% reflectivity over a bandwidth at least between about 730 nm and 870 nm.

The optimized structure is depicted graphically in FIG. 4 in the same manner and units as the structure of FIG. 1. Odd-numbered layers, here, are high-refractive-index layers. It can be seen that layers 1–15 are essentially unchanged from their initial thickness and layers 16–27 are changed only by a few (less than ten) percent. The "conjugate-cavity" structure as evidenced by layers 31 and 32 and 36 and 37 is still clearly recognizable even with the layer thickness changes in layers 28–41 resulting from the optimization.

Following the optimization of structure (1) to the reflection phase-shift of the structure of FIG. 1, the reflectance and reflection-GDD, as functions of wavelength, of the optimized structure were computed using the MACLEOD™ software. The results are depicted in FIG. 5 and FIG. 6 respectively.

Figure 6:
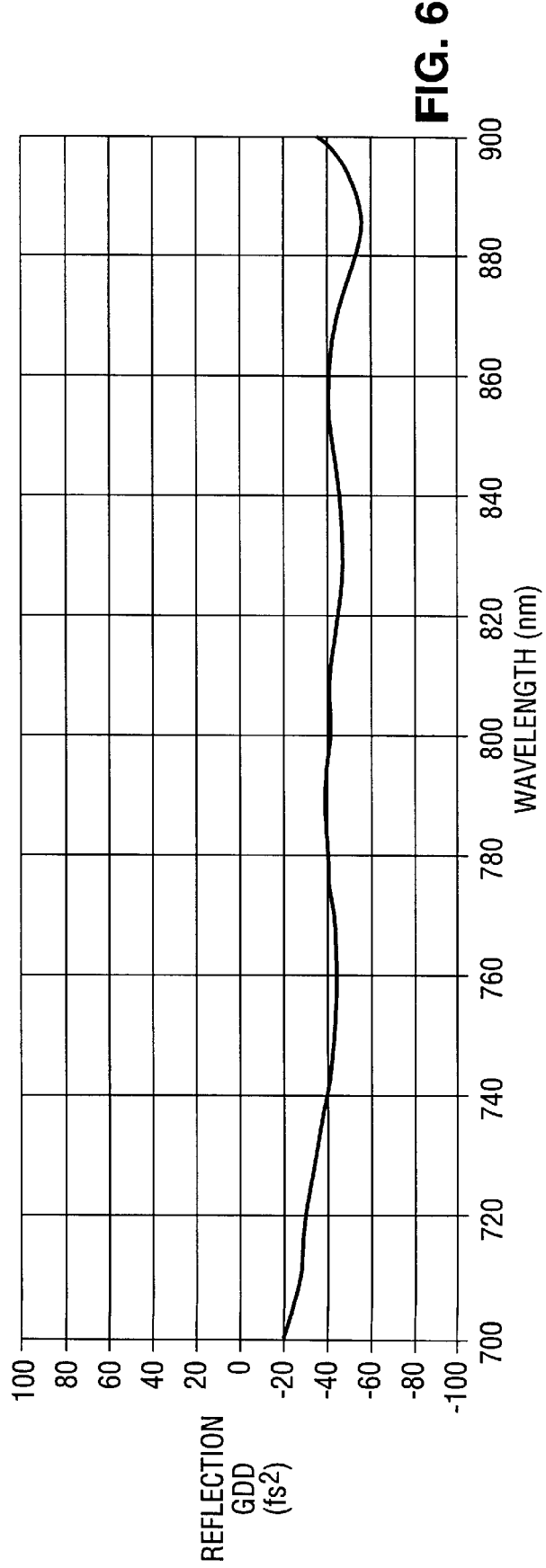
FIG. 6 is a graph schematically illustrating the computed reflection-GDD as a function of wavelength for the NGDD-mirror structure of FIG. 4.

Comparing the graphs of FIG. 3 with FIG. 6 it can be seen that, as expected, the GDD values in the range of phase-optimization are essentially identical. Note that, outside this range, the prior-art structure shows an extreme perturbation of the GDD in the region of 720 nm. There is no such perturbation, however, in the GDD curve of the inventive structure.

Figure 5:
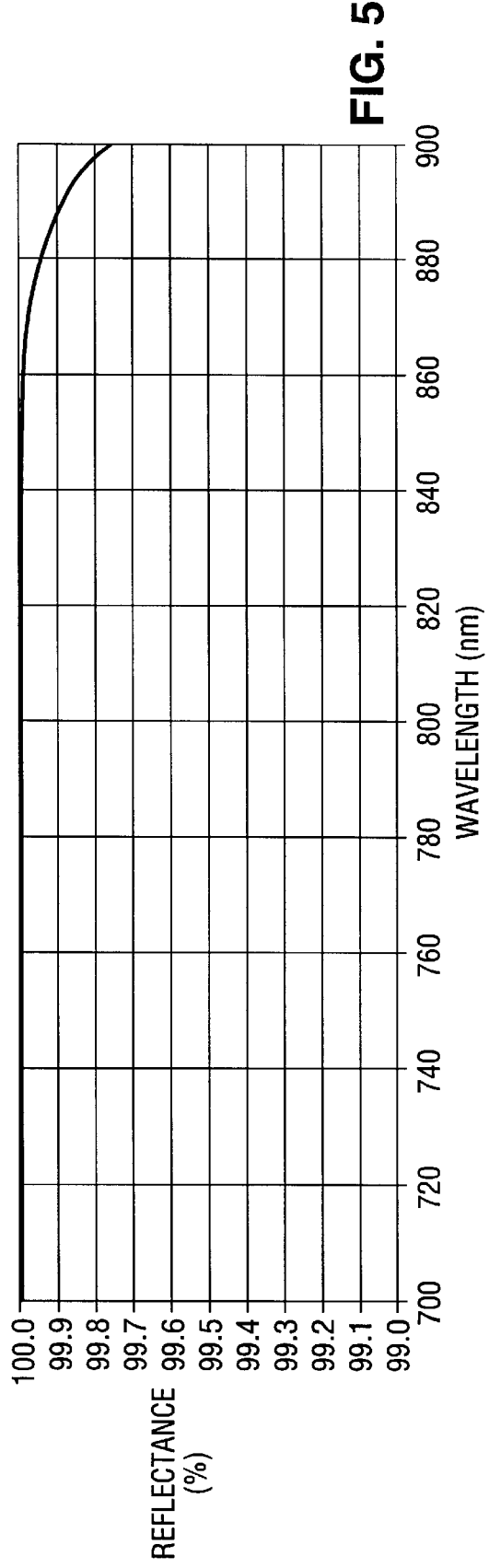
FIG. 5 is a graph schematically illustrating the computed reflection as a function of wavelength for the NGDD-mirror structure of FIG. 4.

Now comparing the graphs of FIG. 2 and FIG. 5 it can be seen that the orderly nature of the inventive structure provides that for essentially the same number of layers (actually one less) having the same refractive index values, the inventive structure provides a much higher reflection over a wider bandwidth, than does the disorderly, widely-varying-layer-thickness, prior-art structure. For example, the prior-art structure reaches 99.99% reflectivity only at about 790 nm falling to about 99.8% and 99.95% at about 730 nm and 870 nm respectively. The GDD perturbation at 720 nm of the prior-art structure is associated with a severe dip in reflectivity in this region. The inventive structure, however, has a reflectivity greater than 99.99% throughout this entire range and greater than 99.999% at peak.

The structure of FIG. 4 can be described as having a rear (mirror or reflector) portion thereof, for example layers 1–23, which primarily provides a desired reflectivity over a desired bandwidth; and a front (phase-retarder) portion thereof, for example layers 24–41, which primarily provides the phase-retardation, and form of that phase-retardation necessary to result in a nearly-constant negative GDD. The term primarily, here, recognizes that the functions of the portions are not absolutely exclusive. Clearly, one portion must complement the other. For, example, whatever phase-retardation dispersion is in the mirror portion (in the structure shown this would typically be relatively flat) adds to that of the front portion. Clearly also, the phase-retarder layers have some effect on the reflectivity of the whole structure, as wavelength-selective reflection is an essential part of the phase-retardation function. In this regard, those skilled in the art will recognize that the division of the structure into mirror and phase-retarder portions is somewhat arbitrary. Certain layers, for example, layers 24–27 may be considered interface layers or interface portion between the mirror and phase-retarder portions.

Figure 7:
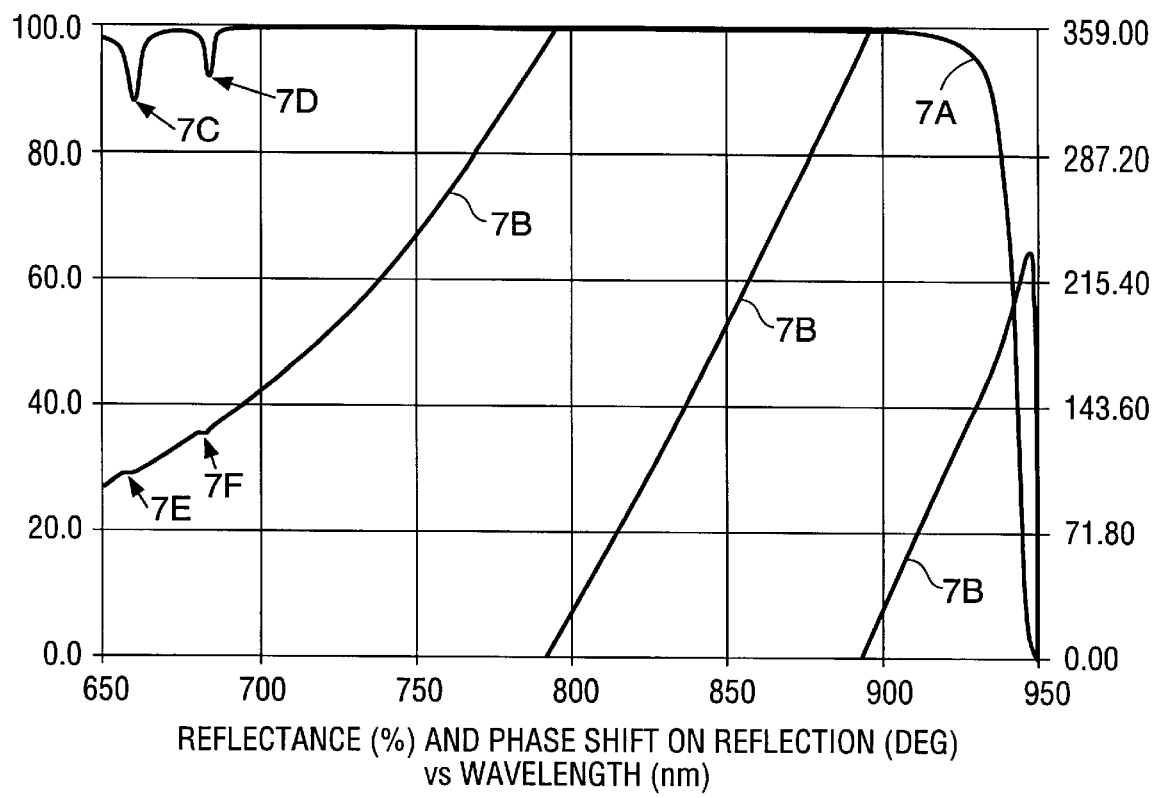
FIG. 7 is a graph schematically illustrating the computed reflection and phase-shift on reflection as a function of wavelength for the 41-layer NGDD-mirror structure of FIG. 4.

This structural and functional concept is illustrated with reference to FIG. 7, FIG. 8. and FIG. 9. FIG. 7 is a graph schematically illustrating the computed reflection and (curve 7A) and phase-shift (curves 7B) on reflection as a function of wavelength for the 41-layer NGDD-mirror structure of FIG. 4. Here, it should be noted that the phase curves show a general, continuing increase in slope. This is required to provide a negative GDD. Also worthy of note are two sharp, narrow dips in reflection 7C and 7D in the wavelength range 650 to 700 nm, and corresponding phase discontinuities 7E and 7F in curve 7B.

Figure 8:
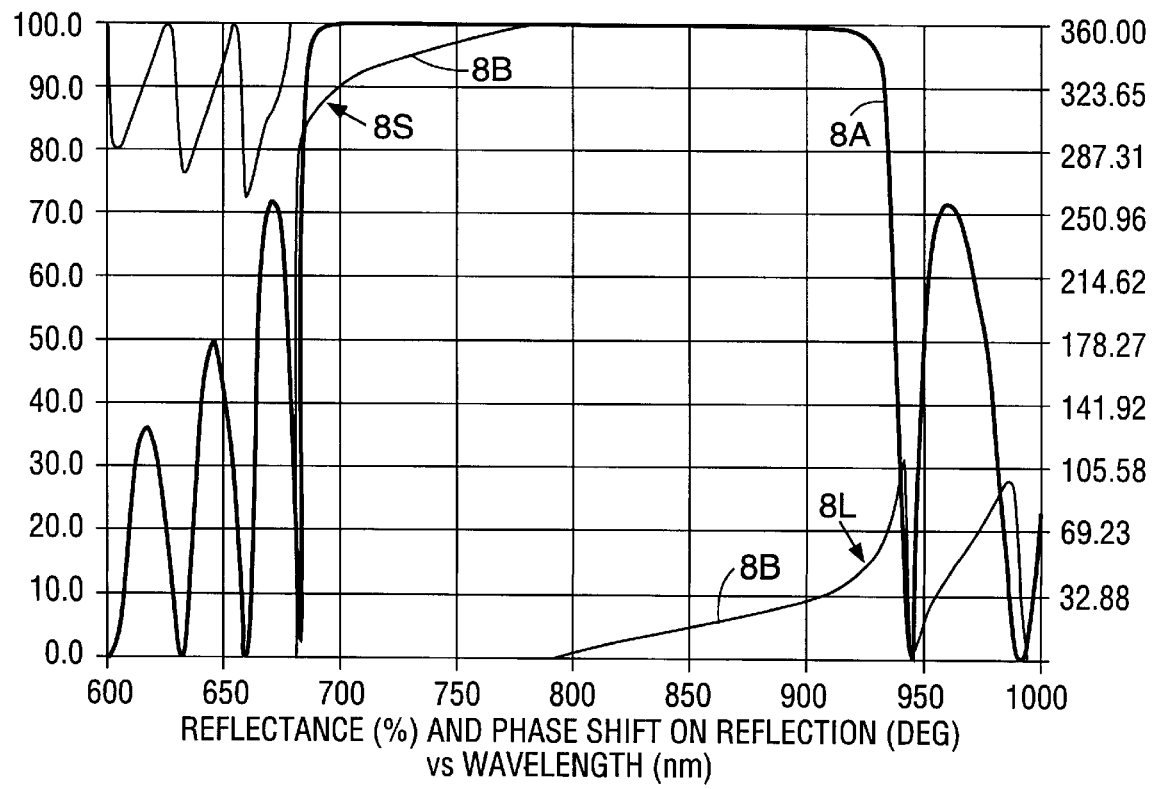
FIG. 8 is a graph schematically illustrating the computed reflection and phase-shift on reflection as a function of wavelength for rear layers 1–25 alone of the NGDD-mirror structure of FIG. 4.

FIG. 8 is a graph schematically illustrating the computed reflection (curve 8A) and phase-shift on reflection (curves 8B) as a function of wavelength for rear layers 1–25 alone of the NGDD-mirror structure of FIG. 4. Those skilled in the art will recognize that the reflection characteristic is essentially that of a "quarter-wave stack" dielectric mirror structure having a center wavelength at about 790 nm which is the QWOT wavelength for layers of the structure of FIG. 4. Here, it should be noted that from an abrupt change in slope at a short wavelength band-extremity 8S at about 700 nm, phase-shift slope first gently decreases to about 0°/360° at 790 nm and then gently increases toward another abrupt change 8L in slope beyond 900 nm. Within the range between about 700 and 900 nm phase change is only about 60° ($\pi/3$). The rapidly varying phase-shift and reflectivity in the wavelength range 650 to 700 nm is that which gives rise to the reflectivity variations and phase discontinuities 7E and 7F in curve 7B.

Figure 9:
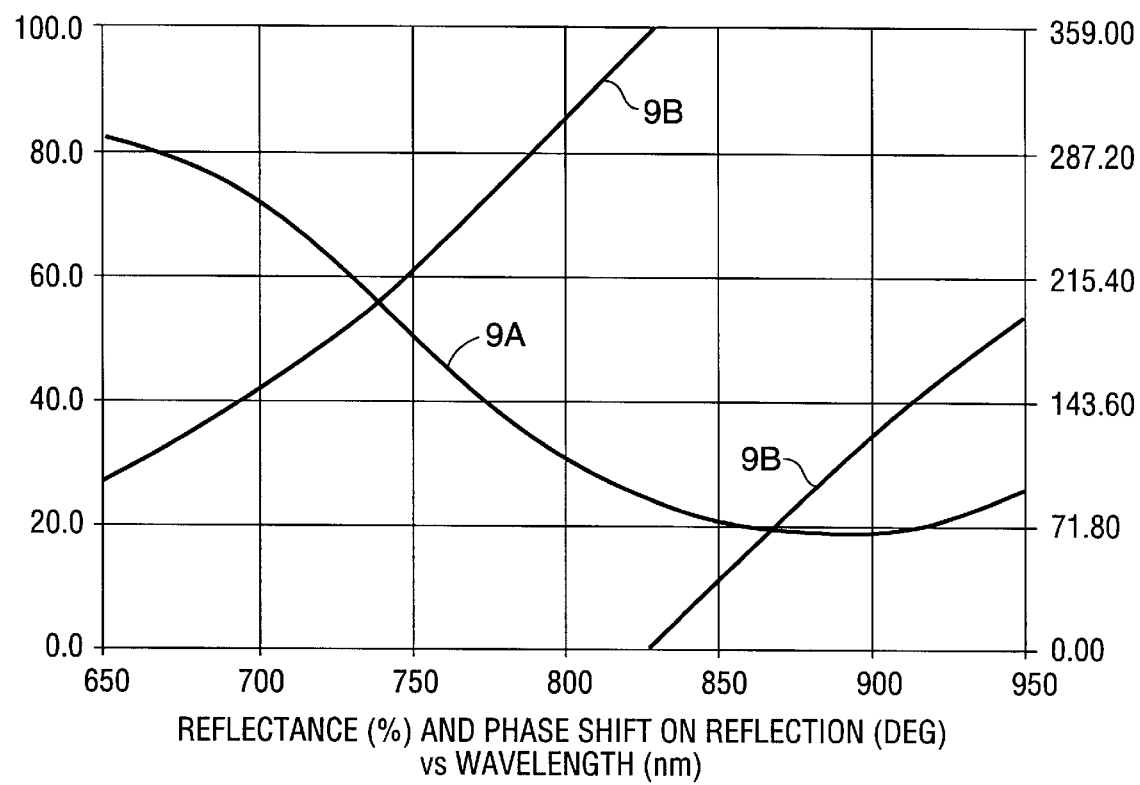
FIG. 9 is a graph schematically illustrating the computed reflection and phase-shift on reflection as a function of wavelength for front layers 26–41 alone of the NGDD-mirror structure of FIG. 18.

FIG. 9 is a graph schematically illustrating the computed reflection (curve 9A) and phase-shift (curve 9B) on reflection as a function of wavelength for front layers 26–41 alone of the NGDD-mirror structure of FIG. 4. Here, it should be noted that the reflection, in general, is low by comparison with the reflectivity of the reflector portion, and is slowly and smoothly varying, progressively reflecting shorter wavelengths in preference to longer wavelengths as might be expected. The phase-shift change across the wavelength region from about 700 to about 900 is almost 360° (almost a full cycle of 2 $\pi$). The slope of the phase-shift change begins to decrease at wavelengths longer than about 790 nm. This is compensated by (or rather is compensating for) the increasing slope of the phase of the rear (mirror) portion to provide the composite phase-shift of the entire NGDD-mirror structure.

Figure 10:
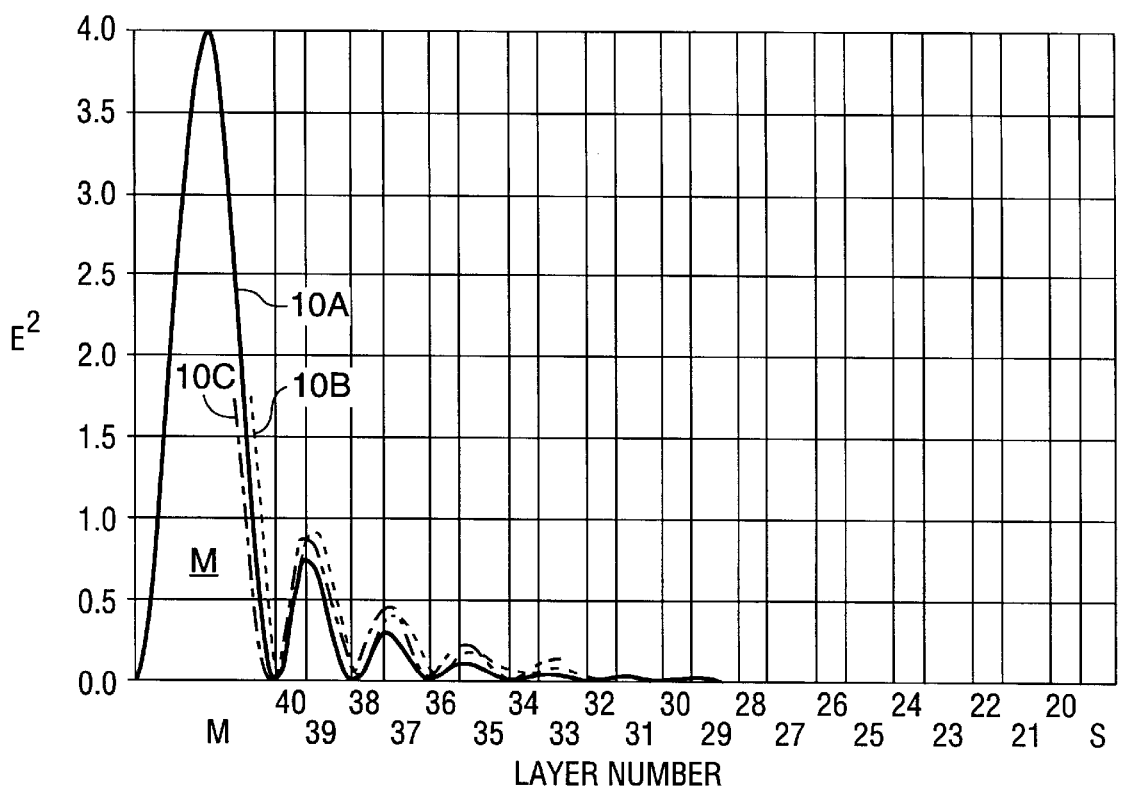
FIG. 10 is a graph schematically illustrating electric field distribution for radiation at 730, 790, and 870 nm wavelength in front layers twenty through forty of a prior-art, forty-layer, all-dielectric, all quarter-wave mirror arranged for peak reflectivity at 790 nm.

The importance of the resonance mechanism (resonant trapping mechanism) in NGDD-mirror structures in accordance with the present invention is next discussed beginning with reference to FIG. 10. Here, the distribution of electric field intensity ($E^2$) for radiation at 730, 790, and 870 nm wavelength (curves 10A–C) in front layers twenty through forty of a prior-art, forty-layer, all-dielectric, all quarter-wave mirror arranged for peak reflectivity at a wavelength of 790 nm, is schematically, graphically depicted. The well-known characteristic amplification of electric field in entrance-medium M in front of the mirror is depicted. As there is no resonant mechanism (sub-structure) in the layer structure for those wavelengths, $E^2$ within the structure at all wavelengths is progressively attenuated with depth in the structure. In the periodically-varying field, each peak has a substantially lower amplitude than (less than half of) the preceding peak, those peaks being barely visible deeper than layer number 30.

Figure 11A:
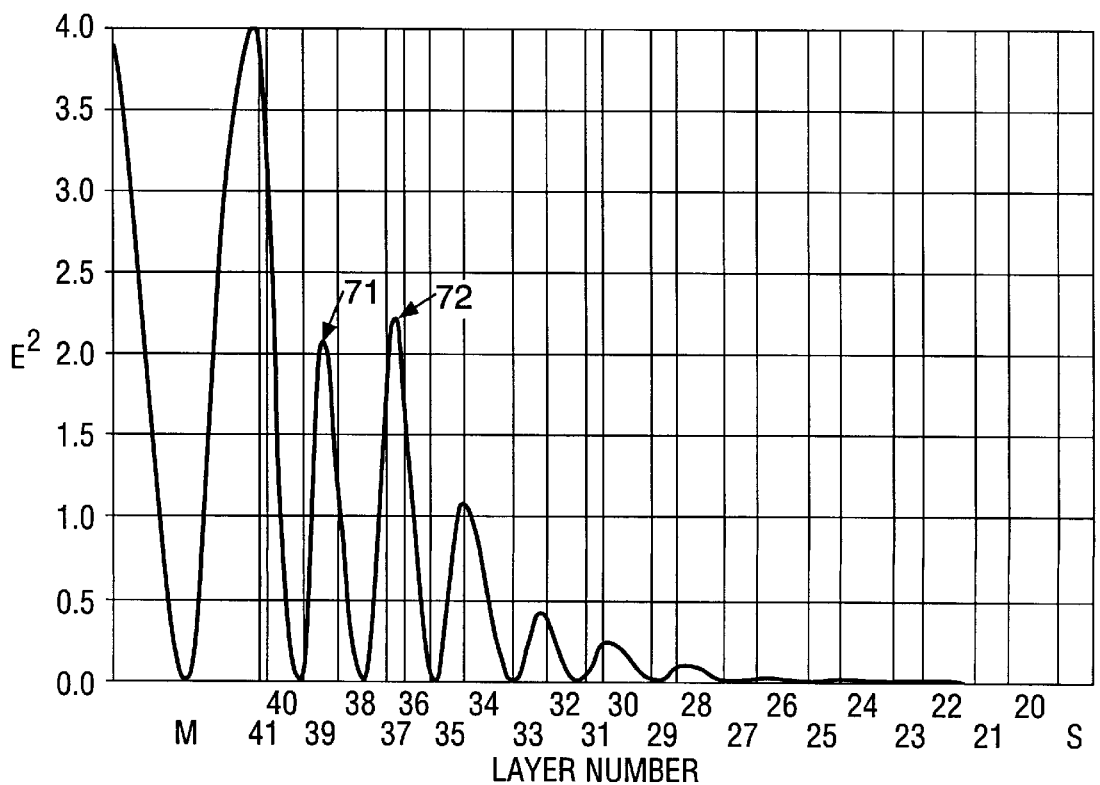
FIGS. 11A–C are graphs schematically illustrating electric field distribution for radiation at 730, 790, and 870 nm wavelength respectively in front layers twenty through forty-one of a the NGDD-mirror structure of FIG. 4.
Figure 11B:
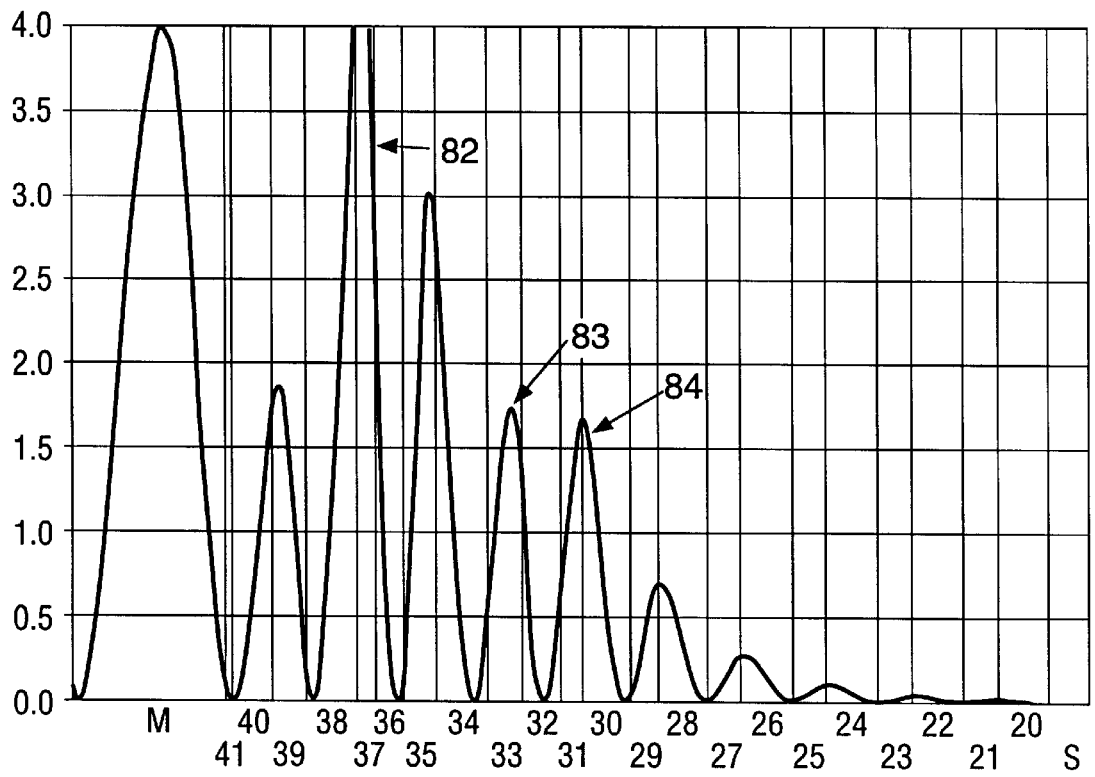
Figure 11C:
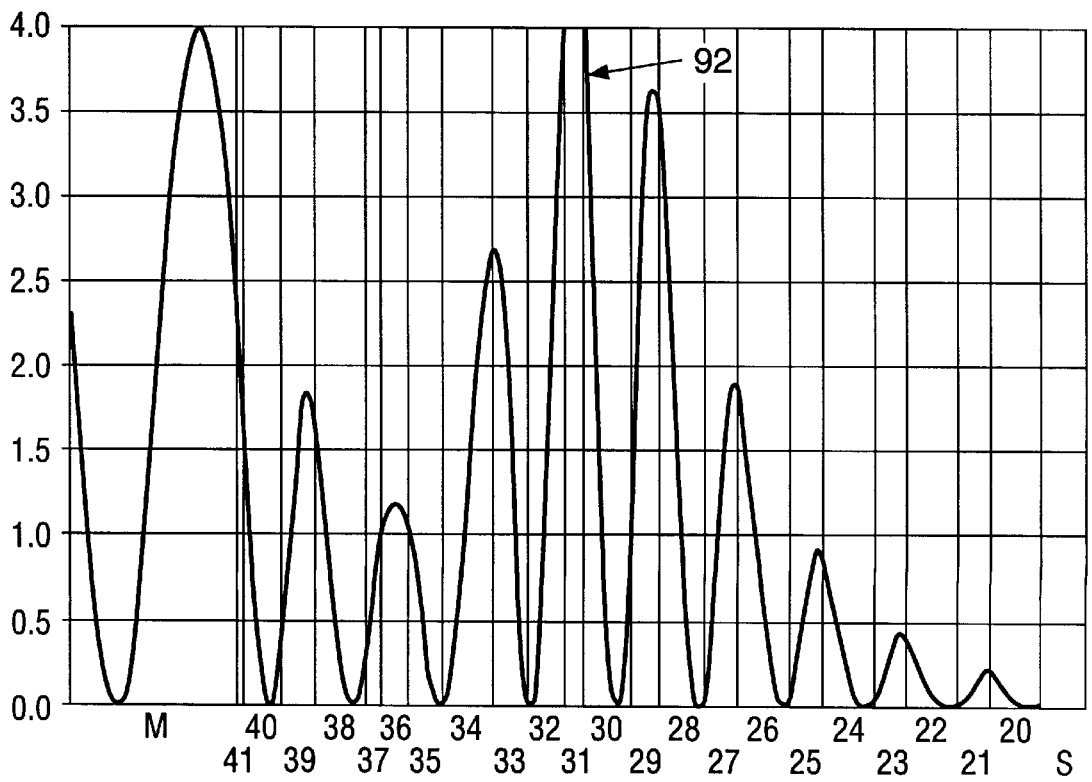

Referring now to FIGS. 11A–C, in FIG. 11A, $E^2$ distribution for radiation at 730 nm wavelength in front layers twenty through forty-one of a the NGDD-mirror structure of FIG. 4 is schematically, graphically depicted. The width of the layers is, in FIGS. 11A–C and in similar graphs herein, in general proportion to their physical thickness. It can be seen that $E^2$ peaks are much higher than illustrated for the quarter-wave mirror of FIG. 10, and that this is due to resonant amplification of $E^2$ in the "conjugate cavity" formed about the junction of layers 36 and 37. Note that the second $E^2$ peak 72 (at this junction) is higher than the first $E^2$ peak 71 and represents the highest intensity at this wavelength in the structure. For layers deeper than this junction, the $E^2$ peaks are progressively attenuated, there being no observable resonant effect (at this wavelength)

from the conjugate cavity centered about the junction of layers 36 and 37. $E^2$ at layer number 22 of this structure is about equal to that at layer number 30 of the quarter-wave mirror of FIG. 10. The deeper penetration of the electric field in the structure of FIG. 4 is clearly caused by the resonant mechanism of the conjugate cavity.

Referring now to FIG. 11B, $E^2$ distribution for radiation at 790 nm wavelength in front layers twenty through forty-one of a the NGDD-mirror structure of FIG. 4 is schematically, graphically depicted. It can be seen that resonance around the junction of layers 36 and 37 is much stronger than at the 730 nm wavelength as indicated by $E^2$ peak 82. It can also be seen that the attenuation of subsequent peaks is interrupted by the onset of resonance in the conjugate cavity formed around the junction of layers 31 and 32. This is evidenced by the nearly-equal peak intensity of $E^2$ peaks 83 and 84.

Referring now to FIG. 11C, $E^2$ distribution for radiation at 870 nm wavelength in front layers twenty through forty-one of a the NGDD-mirror structure of FIG. 4 is schematically, graphically depicted. Here it can be seen that resonance at the conjugate cavity formed around the junction of layers 31 and 32 becomes stronger than at 790 nm as evidenced by peak 92. At the junction of layers 36 and 37 there is still some trace of resonance, although it is not clear to which conjugate cavity it can be attributed.

In the foregoing discussion, an NGDD-mirror structure in accordance with the present invention has been described in terms of a unique double-resonant layer structure which reproduces the NGDD performance of the best prior-art NGDD-mirror of Szipocs et al. without any adverse effects resulting from the deliberate inclusion of resonant mechanisms in the structure, which mechanisms Szipocs et al. teach should be eliminated or avoided. Further, the inventive NGDD structure greatly exceeds the reflection performance which is obtained in that prior-art structure. Set forth below with reference to FIG. 12 and FIG. 13 is a description of how orderly, multiple-resonant NGDD-mirror structures in accordance with the present invention can be used to provide a much greater nearly-constant NGDD than is provided by the above-discussed structures.

Figure 12:
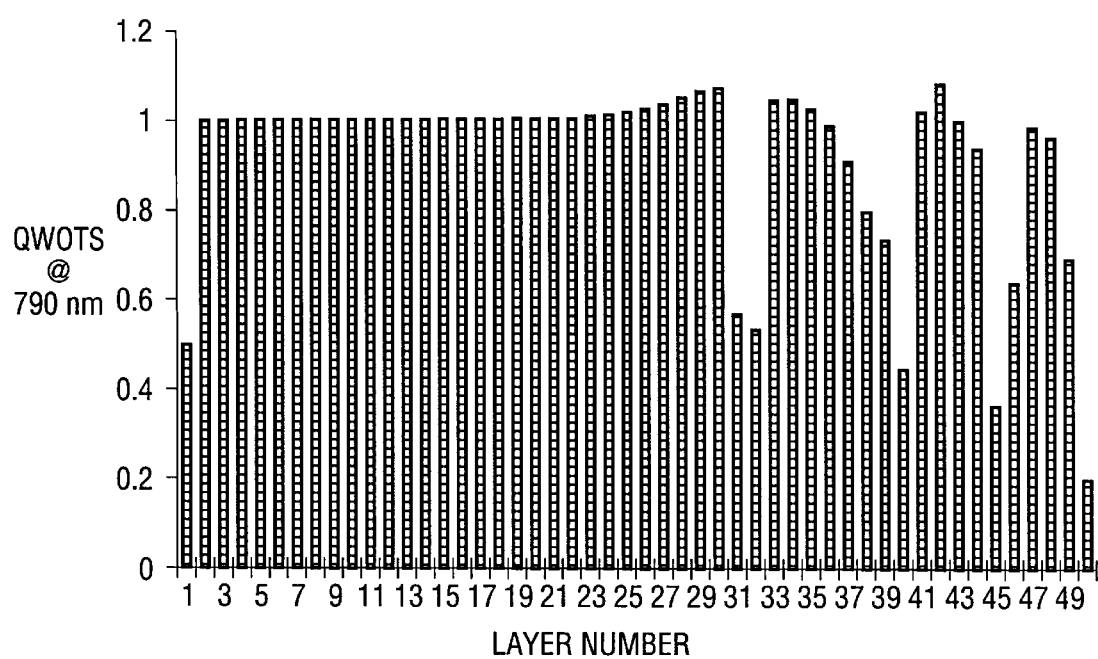
FIG. 12 is a bar graph schematically illustrating a second example of an NGDD-mirror layer structure in accordance with the present invention for providing a substantially constant NGDD of about −80 fs$^2$ and greater than 99.99% reflectivity over a bandwidth at least between about 740 nm and 840 nm.
Figure 13:
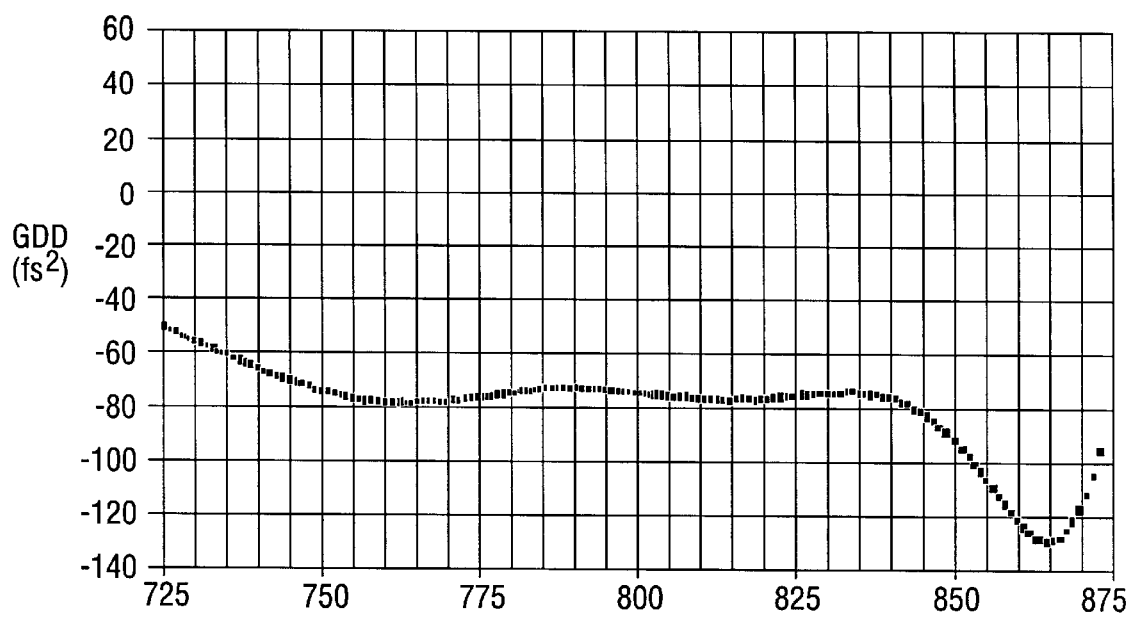
FIG. 13 is a graph schematically illustrating the computed reflection-GDD as a function of wavelength for the NGDD-mirror structure of FIG. 9.

FIG. 12 illustrates, in bar graph form, an inventive NGDD structure derived by computer optimizing (to a target NGDD value of −80 fs$^2$ and a reflectivity of 100% using MACLEOD™ software) a triple-resonant initial structure of the form:

$$(L/2\ H\ L/2)^{15}(H/2\ L\ H/2)^4(L/2\ H\ L/2)^3(H/2\ L\ H/2)^2 \qquad (3)$$

where L and H are as described above for structure 1, with the leftmost layer being on the substrate, i.e., odd-numbered layers are low-refractive-index layers. The computed GDD as a function of wavelength for the structure of FIG. 12 is schematically depicted in FIG. 13. The GDD varies less than ±10% about a nominal value of about −78 fs$^2$ between about 740 and 840 nm. Reflectivity over this range is greater than about 99.99%.

Those skilled in the art will recognize from FIG. 12 that as a result of optimization, the initial layer group (L/2 H L/2)$^3$ of initial structure (3) has been altered in form such that, in effect, there is an L/2 equivalent layer of the group "missing". The original junction of the cavity now appears to be defined by only one (high refractive index) eighth-wave layer 41. It should be noted, however that this is still sufficient to form the center of a virtual-cavity or conjugate-cavity. An empirical description of a mechanism for this is described in detail further below.

Figure 14:
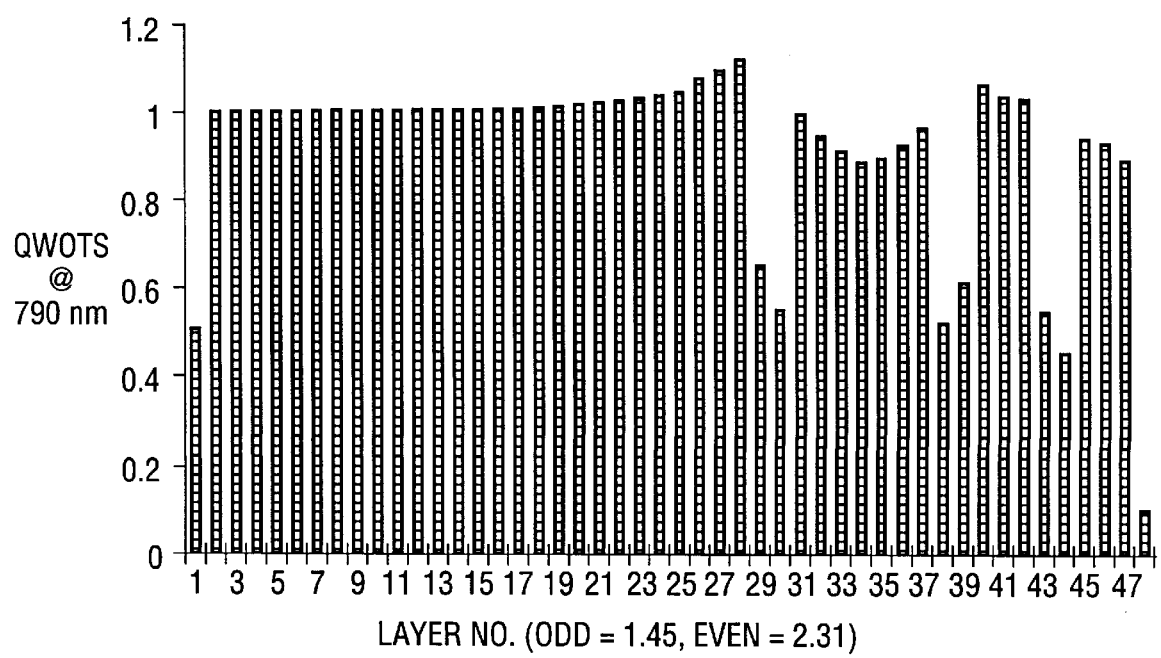
FIG. 14 is a bar graph schematically illustrating a third example of an NGDD-mirror layer structure in accordance with the present invention for providing a substantially constant NGDD of about −80 fs$^2$ and greater than 99.99% reflectivity over a bandwidth at least between about 740 nm and 840 nm.

In FIG. 14 is schematically depicted, in bar graph form, a structure which was computer optimized using the computed reflection phase as a function of wavelength of the structure of FIG. 12 as a target, and using an initial structure $$(L/2\ H\ L/2)^{15}(H/2\ L\ H/2)^4(L/2\ H\ L/2)^2(H/2\ L\ H/2)^2 \qquad (4)$$

where H and L are as specified above for the structure of FIG. 4 and odd-numbered layers are low-refractive-index layers. The variable-metric optimization method of TFCalc™ was used for the optimization, with phase-shift only as an optimization target.

It can be seen that, following this optimization, the general form of initial structure is still clearly recognizable. The computed GDD as a function of wavelength for the structure of FIG. 14 is essentially exactly as schematically depicted in FIG. 13, as might be expected. From the above-presented description and consideration of the structure of FIG. 14, resonance peaks for E2 would be expected near the junction of layers 43 and 44; 38 and 39; and 29 and 30.

Figure 15A:
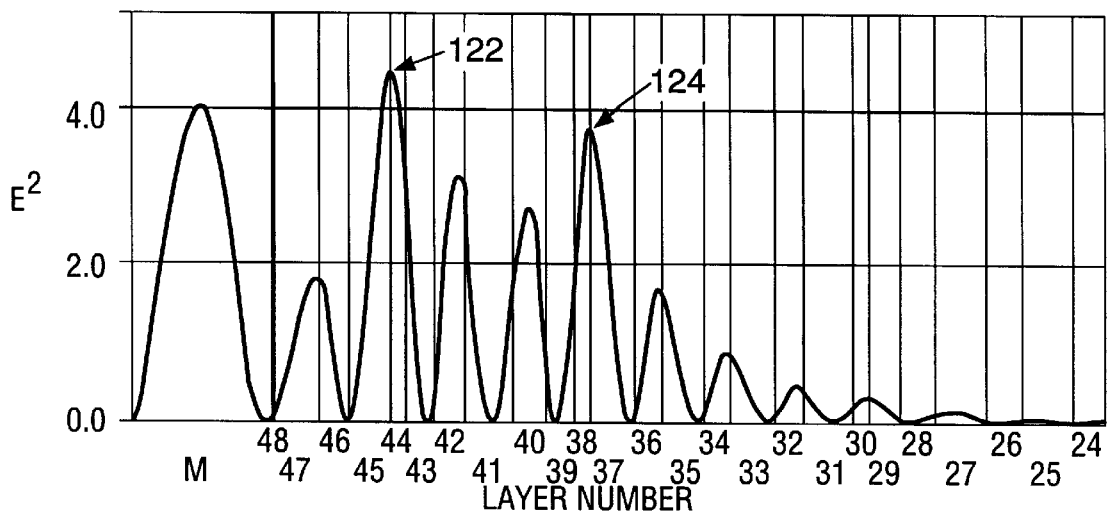
FIGS. 15A–C are graphs schematically illustrating electric field distribution for radiation at about 772, 825, and 845 nm wavelength respectively in front layers twenty-four through forty-eight of a the NGDD-mirror structure of FIG. 11.
Figure 15B:
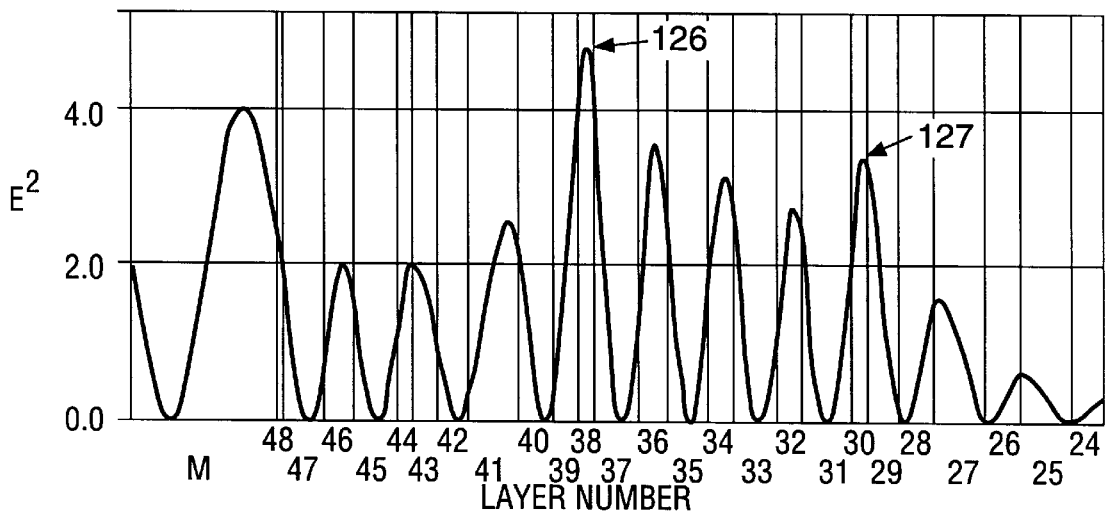
Figure 15C:
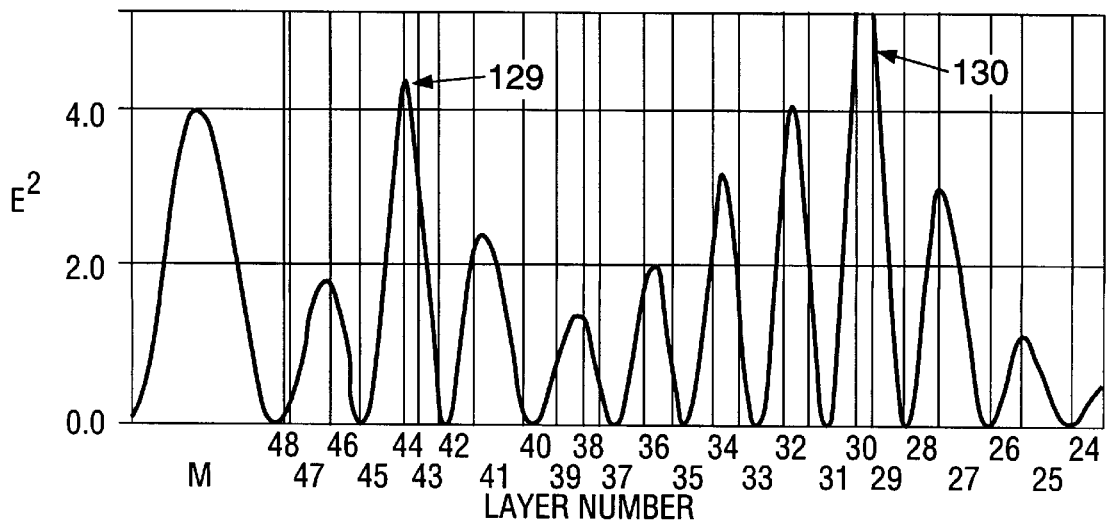

This expectation is verified by FIGS. 15A–C which schematically illustrate electric field distribution for radiation at about 772, 825, and 845 nm wavelength, respectively, in front layers twenty-four through forty-eight of a the NGDD-mirror structure of FIG. 14. In FIG. 15A resonance peaks 122 and 124 occur about the junction of layers 43 and 44, and 38 and 39 respectively. In FIG. 15B resonance peaks 126 and 127 occur about the junction of layers 38 and 39, and 29 and 30 respectively. In FIG. 15C resonance peaks 129 and 130 occur about the junction of layers 43 and 44, and 29 and 30 respectively.

It should be noted here that the electric field sampling wavelengths of FIGS. 15A–C are chosen to demonstrate that resonance does in fact occur where it might be expected. Those skilled in the art who chose to investigate a similar structure in more detail at any other wavelengths within the effective constant GDD bandwidth will find that resonance always occurs about at least one of the three junctions, and only about one or more of these three junctions. Here, it should be kept in mind that a conjugate-cavity characteristic is that the resonance peak occurs at one side or another of the actual interface between the dissimilar eighth-wave (near eighth-wave after optimization) layers.

A remarkable feature of the inventive layer structures depicted in FIGS. 4, 12 and 14, considering teachings to the contrary of the prior art, is that most of the layers have an optical thickness close to a QWOT at the nominal (frequency) center of the reflection band produced thereby. By way of example, in FIG. 4, 34 of 41 layers (more than 80%) are within 10% of a 790 nm QWOT, and in FIG. 14, 40 of 48 layers are within ±10% of a 790 nm QWOT. In what can be defined as the mirror sections of these structures all layers but the first are within ±10% of a QWOT. In practice this first layer may be omitted without any significant effect on NGDD performance.

Further, it will be noted from FIGS. 4, 12, and 14 and corresponding electric field penetration data of FIGS. 15A–C and the like, that many layers on the substrate side of a structure (the mirror portion) are not needed to create the desired NGDD effect but are merely included to boost reflectivity. Accordingly, those skilled in the art who choose to experiment with the structures and principles of the present invention taught herein will find that, within limits, the front, NGDD-forming portion of a structure may retain a closely similar structure if QWOT layers are added to or subtracted from the mirror portion to raise overall reflectivity. Further, it is possible to select a common thickness of those essentially QWOT layers near the substrate which will align the peak of a reflection band with the center of a useful range of NGDD. It is even possible to replace a group of one-QWOT layers with a layer of a highly-reflective metal and still achieve at least about the same NGDD performance and reflectivity of the prior-art, Szipocs et al. structure.

Figure 16:
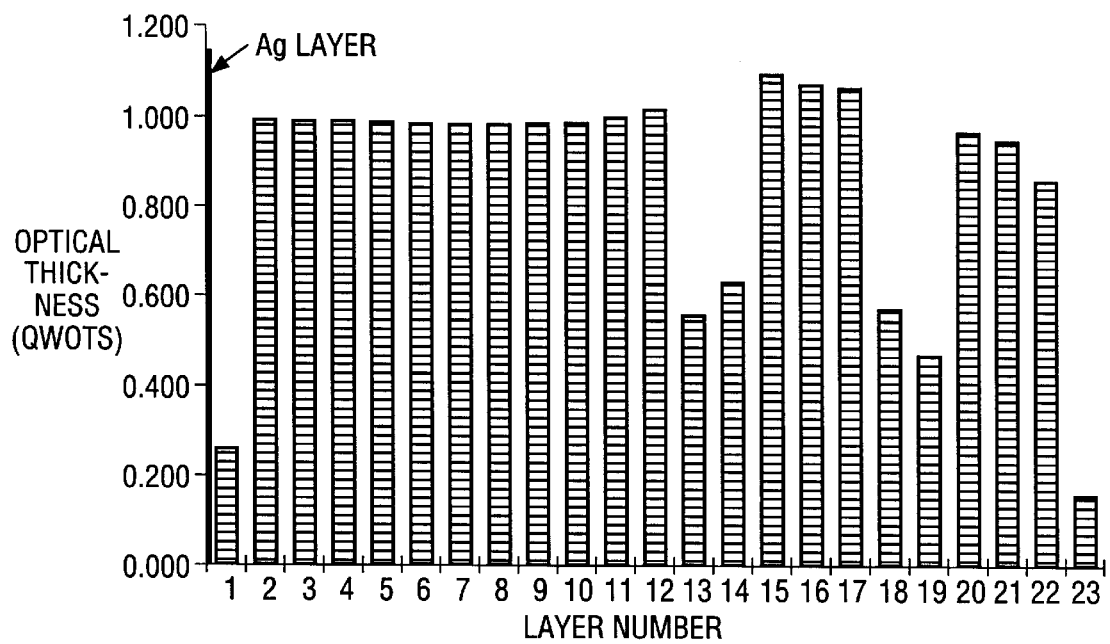
FIG. 16 is a bar graph schematically illustrating a fourth example of an NGDD-mirror layer structure in accordance with the present invention including a silver layer surmounted by 23 dielectric layers providing a substantially constant NGDD of about −45 fs$^2$, and greater than 99.9% reflectivity over a bandwidth at least between about 730 nm and 870 nm.
Figure 17:
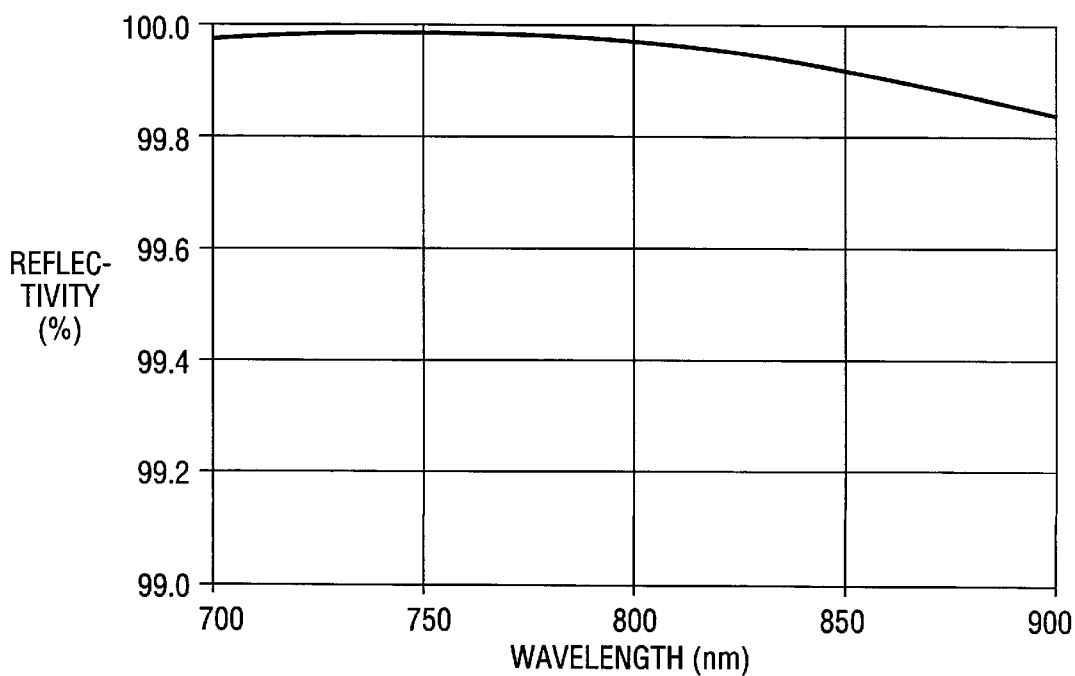
FIG. 17 is a graph schematically illustrating reflectivity as a function of wavelength for the structure of FIG. 16.

Such a structure is illustrated, in bar-graph form, in FIG. 16 wherein odd-numbered layers are high-refractive-index layers. The structure is depicted as deposited on a silver (Ag) layer (not numbered). This structure was derived by eliminating layers 2–19 of the already optimized structure of FIG. 4, setting the remaining layers on an opaque layer of silver and re-optimizing to the reflection-phase as a function of wavelength for the structure of FIG. 4, which, of course, provides essentially the same GDD performance. In this regard, the similarity of the thickness relationship of layers 13–23 of the structure to corresponding layers 31–41 of FIG. 4 and corresponding layers 38–48 should be noted. Reflection as a function of wavelength for the structure of FIG. 16 is schematically depicted in FIG. 17 and can be compared with the reflectivity obtained by Szipocs (FIG. 2) with almost twice as many layers but with essentially identical GDD performance. Similar structures may be derived for layers of other highly-reflective metals, such as aluminum (Al), magnesium (Mg) or gold (Au). Structures may be deposited on a polished substrate of a highly-reflective metal rather than a on layer of the highly-reflective metal on some other substrate.

In initial designs for NGDD-mirrors, preference has been given to the index-conjugate effect, resulting from the juxtaposition of eighth-wave layers by juxtaposition of $(H/2\ L\ H/2)^n$ and $(H/2\ L\ H/2)^m$ groups (where n and m can be equal or different integers), for forcing the resonance in the inventive structures which provides the NGDD with a minimum amount of layers. As observed with reference to FIG. 12 however, resonance can be created when a single layer about one-eighth wavelength or less in optical thickness is located between two significantly thicker layers. This is explained below with reference to FIG. 18. Here, a simple 11-layer resonant structure is shown that was created by beginning with a structure $(H\ L)^5\ H$ at 790 nm, where H and L have the same values as in other above-discussed structures. The beginning structure was optimized to a single target of 4.25% reflectance at 790 nm. Layers five, six and seven were allowed to be variable. Layer number six was constrained to be variable only in a thickness range from 0.3 to 1.0 QWOTS, to avoid optimizing to a Fabry-Perot cavity by eliminating this layer and consolidating the bounding layers. The $E^2$ distribution in the structure, at 790 nm, is shown in FIG. 19.

Figure 18:
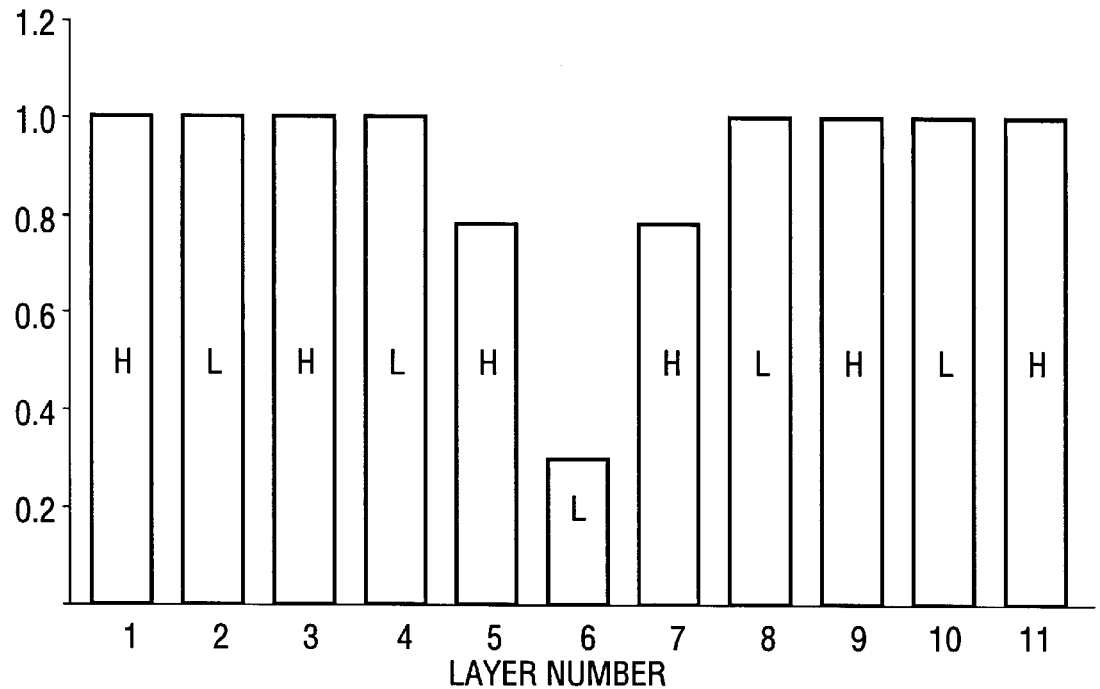
FIG. 18 is a bar graph schematically illustrating a simple, orderly, symmetrical eleven layer resonant structure with no layer having a thickness greater than one-quarter wavelength at the resonant wavelength.
Figure 19:
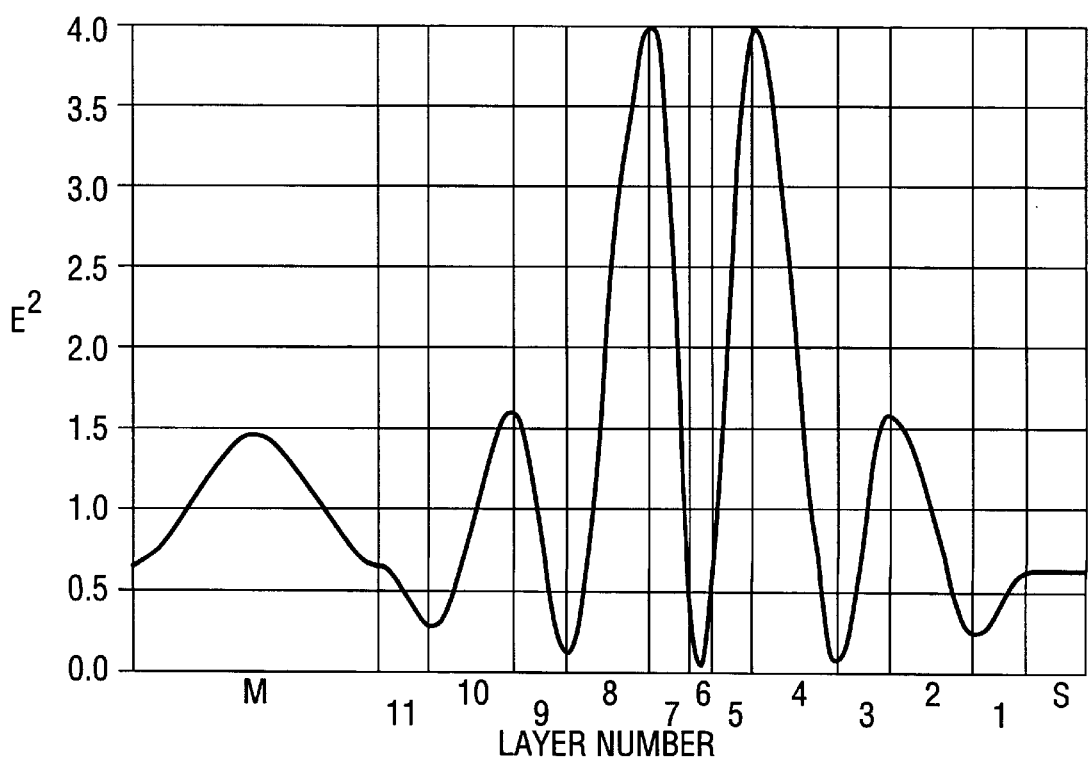
FIG. 19 schematically illustrating electric field distribution at the resonant wavelength in the structure of FIG. 18.
Figure 20:
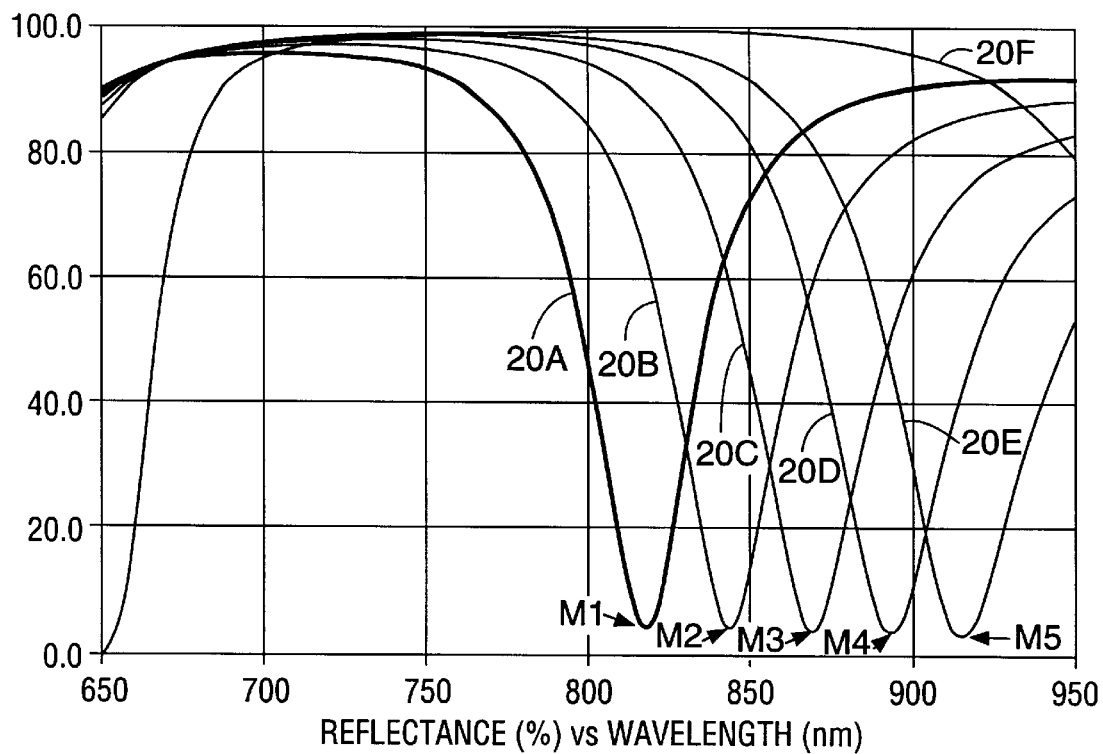
FIG. 20 is a graph schematically illustrating reflectivity as a function of wavelength for an eleven layer structure (HL)$^2$ fH (LH)$^2$, with QWOT at 790 nm wavelength, for values of f of 0.5, 0.4, 0.3, 0.2 and 0.1.

The structure of FIG. 18 was designed to induce resonance at the center (QWOT) wavelength (790 nm) of the layers in the structure. From a similar structure resonance can be induced by the simple mechanism of reducing the thickness of only one of the layers. This concept is illustrated in FIG. 20 which graphically depicts (curves 20A–E) reflectivity as a function of wavelength for a symmetrical eleven-layer structure $(HL)^2HfLH(LH)^2$, with QWOT at 790 nm wavelength, for values of f of 0.1, 0.2, 0.3, 0.4 and 0.5 respectively. Curve 20F depicts the reflectivity as a function of wavelength for the "initial", eleven-layer, all-quarter-wave mirror, i.e., where f=1.0. Curves 20A–E have reflection minima M1–5, respectively, which lie within the reflection bandwidth of the initial structure. Those familiar with the art will recognize that when f=0.0 the structure reduces to a nine-layer Fabry-Perot structure $(HL)^2 2H(LH)^2$ which would have minimum reflection and maximum transmission at 790 nm. Those familiar with the art should also recognize that all of the minima M1–5 are the result of resonance effects similar to those which provide minimum reflection and maximum transmission in the Fabry-Perot type structure. Those familiar with the art should further recognize that in asymmetrical layer arrangements (with more layers on one side of a virtual cavity than the other) reflection minima will occur at higher values. As these minima are created by the resonance effect it can be seen how the thickness of the sub-QWOT layers in the inventive structures is used, in optimizing, to "tailor" selective resonant-trapping of certain wavelengths as a means of providing the required negative GDD.

It has been found that in designing above-described NGDD-mirror structures in accordance with the present invention, at least an initial computer optimization can be made by first manually providing a starting structure by entering an equal-optical-thickness (quarter-wave) stack, of the type $(H\ L)^n H$, for a desired operating wavelength range and reflectivity, then manually reducing the thickness of at least the first and one or more other layers, for example, the fifth and eleventh, to provide an initial placement of resonant cavities in the stack. These will initially manipulate the phase-dispersion into a general form required to provide high NGDD, however, requiring further refinement to provide nearly-constant negative GDD. From this initial insertion of resonant effective, virtual, or conjugate-cavities, computer (automatic) optimization will proceed much more rapidly and use primarily outermost layers to achieve, as closely as is possible, the desired NGDD (and reflectivity). This then leaves the remaining layers at near-equal optical thickness for example within about 10% of some nominal average value, for providing as high as possible a reflectivity from the number of layers and their refractive index.

Having started optimizing in this way, and depending on the optimization algorithm and target settings, the resulting optimized stack should be fairly orderly and have a large percentage of adjacent layers about the same optical thickness. In this regard, it may be found useful to allow, at least initially, only the outermost 15 to 20 layers to be optimized. If the optimized structure resembles one of the orderly forms discussed above or some other recognizable resonant structure, such a structure can be used for as a starting point (starting-structure) for a second optimization, which, in most instances will provide an even more orderly optimized structure. Also, once a satisfactory GDD performance is obtained, it is then possible to create orderly structures, as noted above, by optimizing to the corresponding reflection-phase-shift versus-wavelength (phase-dispersion) curve, rather than GDD. In this way, depending on processor-speed of whatever computer is used, structures can be evaluated in minutes rather than hours, or even days of computing time, even if as many as twenty or thirty target phase-values are used.

Up to this point in this description of the inventive NGDD-mirror structures, the structures described are those which provide a nearly-constant GDD at a desired reflectivity over a wavelength range or bandwidth within (less than) what might be referred to as the "normal" or characteristic reflection bandwidth associated with the high and low refractive index values of layers of the structure. Simply defined, this normal reflection bandwidth is the bandwidth of an all-quarter-wave reflector stack. The level at which the bandwidth is measured can be arbitrarily defined, for example: at 99.0% reflectivity or greater; at 99.9% reflectivity or greater, or at whatever level is appropriate. As noted above, an all-quarter-wave stack also provides the highest peak reflectivity available with a given number of layers having those indices.

Clearly, there will be-applications in which NGDD-mirrors operable over a bandwidth greater than the "normal mirror bandwidth" will be of advantage. NGDD-mirror structures in accordance with the present invention can be designed to operate at such an extended bandwidth. One example of such a structure is described below, beginning with reference to FIG. 21, FIG. 22, and FIG. 23.

Figure 21:
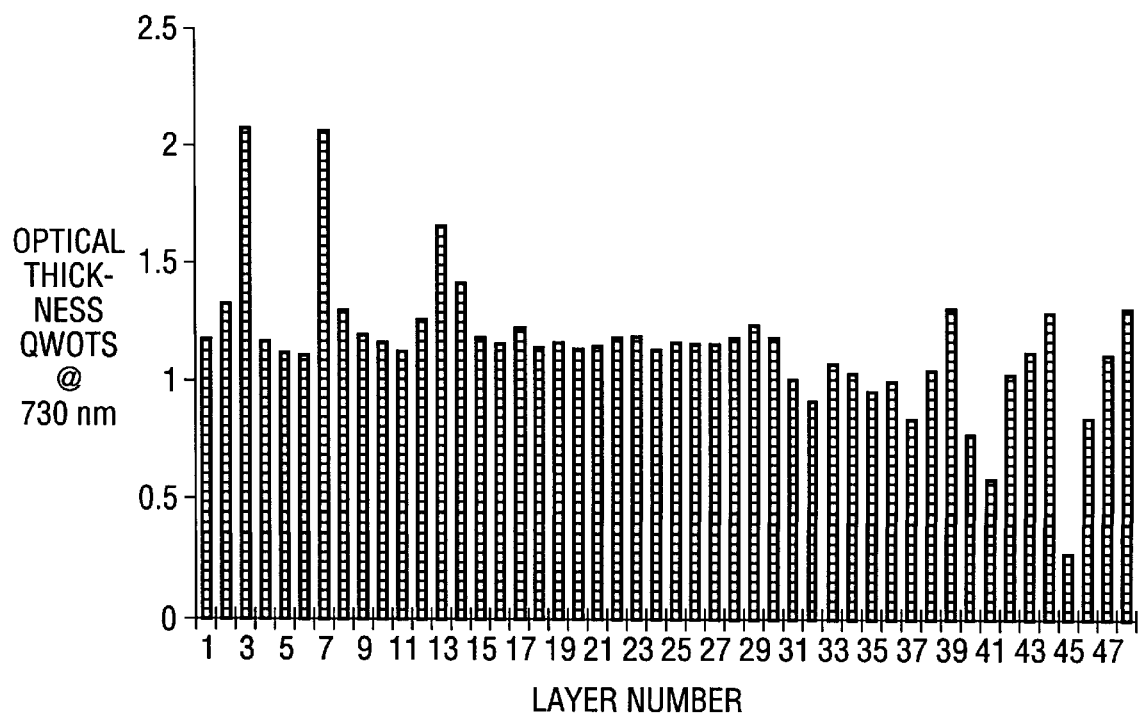
FIG. 21 is a bar graph schematically illustrating a sixth example of an NGDD-mirror layer structure in accordance with the present invention for providing a substantially constant NGDD of about −50 fs$^2$ and greater than 99.90% reflectivity over a bandwidth at least between about 770 nm and 1000 nm.

FIG. 21 is a bar chart schematically illustrating optical thickness of layers of a forty-eight layer structure in accordance with the present invention. Odd and even-numbered layers have respectively the 2.31 high refractive index and 1.45 low refractive index of other examples described above. In FIG. 21, it should be noted that QWOTS are at 730 nm rather than the 790 nm of other above-described examples.

Figure 22:
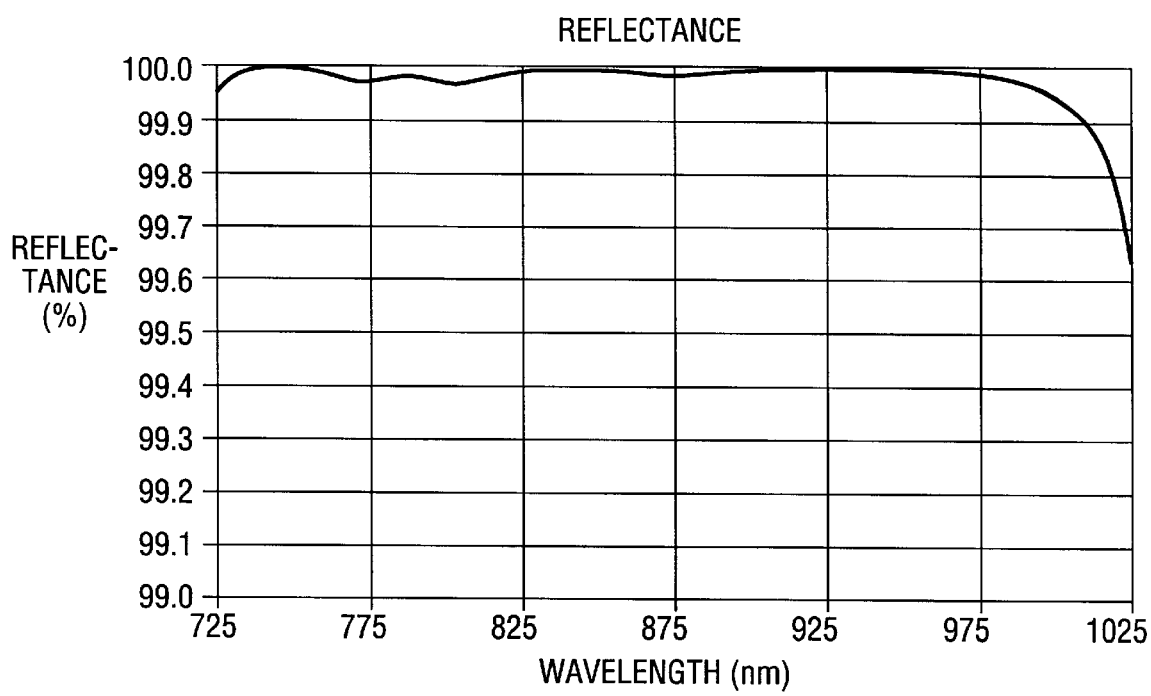
FIG. 22 is a graph schematically illustrating the computed reflection as a function of wavelength for the NGDD-mirror structure of FIG. 21.
Figure 23:
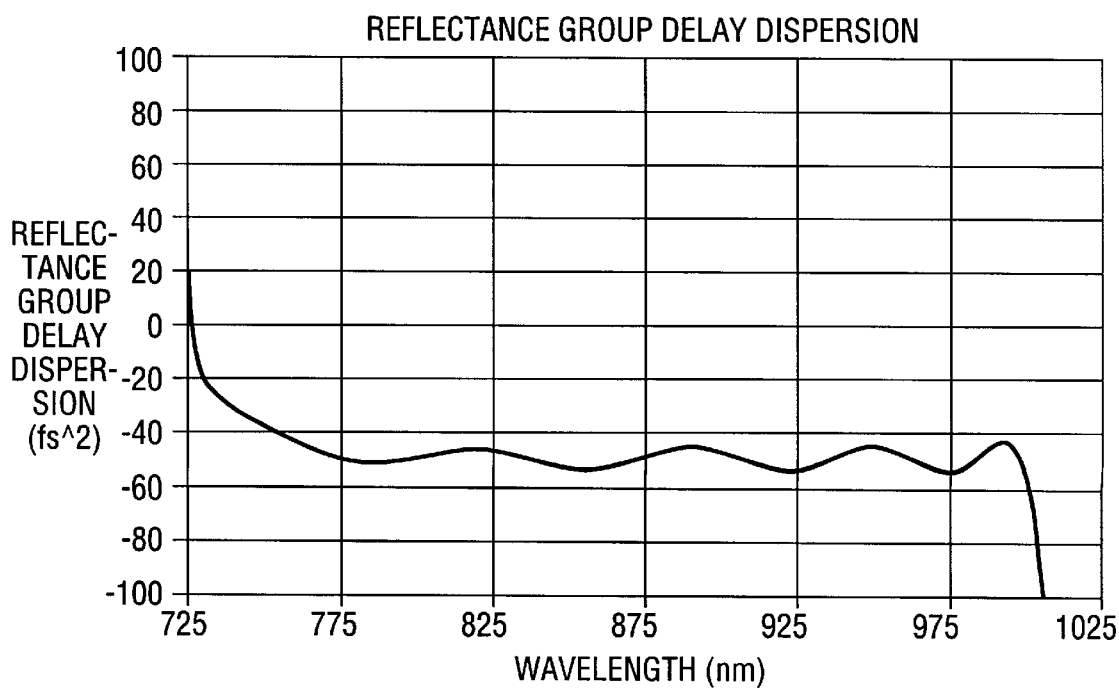
FIG. 23 is a graph schematically illustrating the computed reflection-GDD as a function of wavelength for the NGDD-mirror structure of FIG. 21.

FIG. 22 is a graph illustrating the computed reflection as a function of wavelength for the NGDD-mirror structure of FIG. 21. FIG. 23 is a graph schematically illustrating the computed reflection-GDD as a function of wavelength for the NGDD-mirror structure of FIG. 21. It can be seen that the reflection of the structure of FIG. 22 is greater than 99.9 percent between about 720 nm and 1000 nm, i.e., a 280 nm bandwidth at this level. From FIG. 23 it can be seen that reflection-GDD is relatively nearly-constant (within about ±10%) about a reflection-GDD of −50 $fs^2$ from about 770 nm to 1000 nm, i.e. an NGDD bandwidth of about 230 nm.

Figure 24:
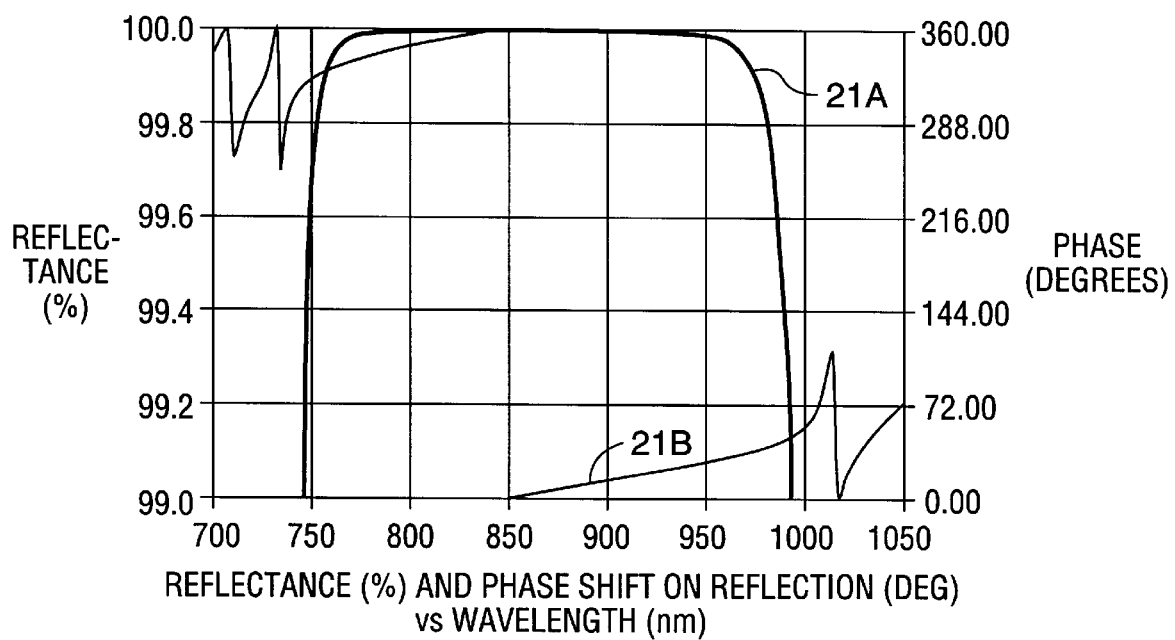
FIG. 24 is a graph schematically illustrating the computed reflection and phase-shift on reflection as a function of wavelength for a prior art 27 layer quarter-wave mirror.

Referring now to FIG. 24, the computed reflectivity (curve 21A) and phase-shift on reflection (curve 21B) of a prior art quarter-wave stack of 27 layers ((H L)$^{13}$H @850 nm) of index 2.31 and 1.45 is depicted. Comparing this with the reflectivity illustrated in FIG. 22 for the structure of FIG. 21, it can be seen that, while the peak reflectivity is comparable, the 99.9% -bandwidth of the quarter-wave stack extends only from about 760 nm to 970 nm, i.e., a bandwidth of 210 nm. Comparing the reflectivity of the structure of Szipocs, depicted in FIG. 2, it can be seen that the 99.9% bandwidth of Szipocs' structure extends from 740 nm to 900 nm, i.e., a bandwidth of about 160 nm, or about 40 nm less than a comparable "normal" mirror. The Szipocs structure (FIG. 3) has a −45 $fs^2$ NGDD bandwidth of about 140 nm. So it can be seen that the structure of FIG. 21 provides a reflection bandwidth and a NGDD bandwidth which each exceed the comparable reflection bandwidth of a normal mirror, and far exceed that of the prior-art Szipocs structure.

The structure of FIG. 21 can be analyzed, as discussed above for other examples of the inventive NGDD-mirrors, by considering it as having a front portion primarily taking care of providing a desired reflectivity and reflection bandwidth, and a rear (mirror or reflector) portion primarily taking care of providing the high phase-dispersion (from a minimum of π to one or more cycles of 2 π) and phase-dispersion shaping necessary to provide a desired constant NGDD over a desired bandwidth. Optionally, a few intermediate layers may be considered as "interface" layers. Surprisingly, in the mirror portion of the structure of FIG. 2, more than eighty-percent of the layers have an optical thickness of about 1.15 QWOT at 730 nm. This is equivalent to an optical thickness of about one QWOT at about 840 nm, which is within the operative wavelength range near the frequency-center thereof. As in all other above-described examples of the inventive NGDD-mirrors, structure 21 relies on resonant mechanisms or sub-structures in the front portion of the structure to provide the desired NGDD property.

Figure 25A:
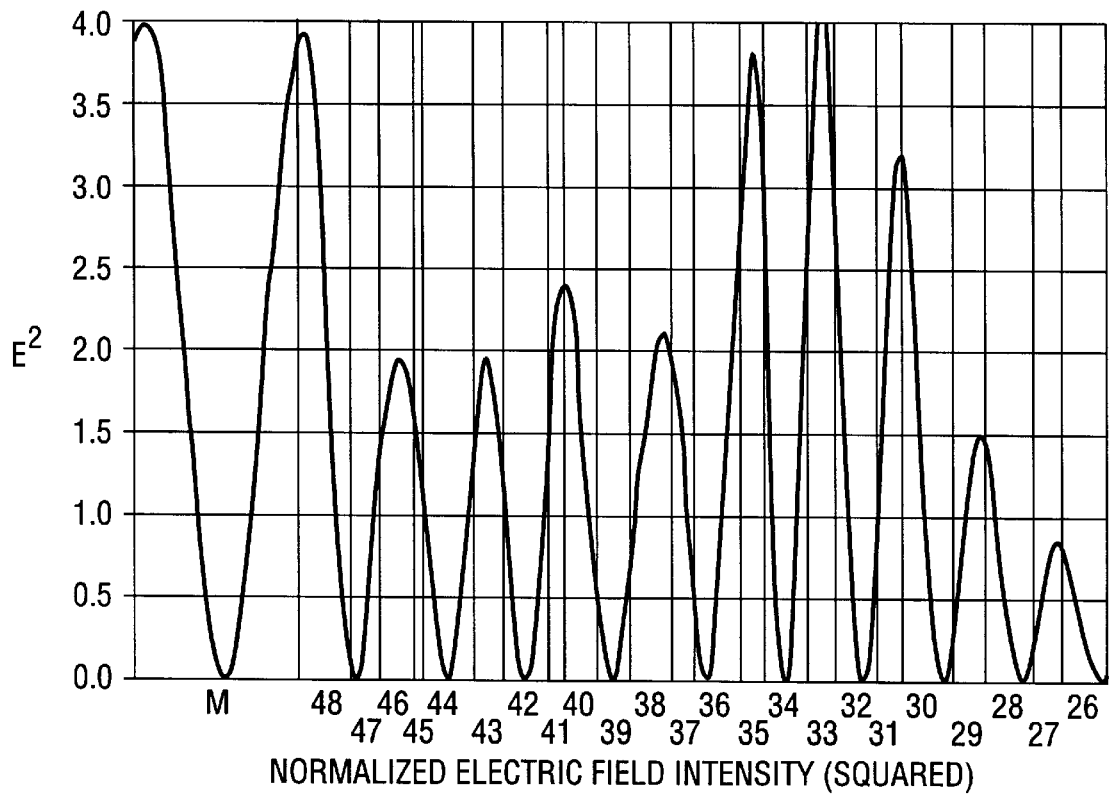
FIGS. 25A and 25B are graphs illustrating electric field distribution for radiation at about 950 nm and 1000 nm wavelength respectively in front layers twenty-six through forty-eight of a the NGDD-mirror structure of FIG. 21.
Figure 25B:
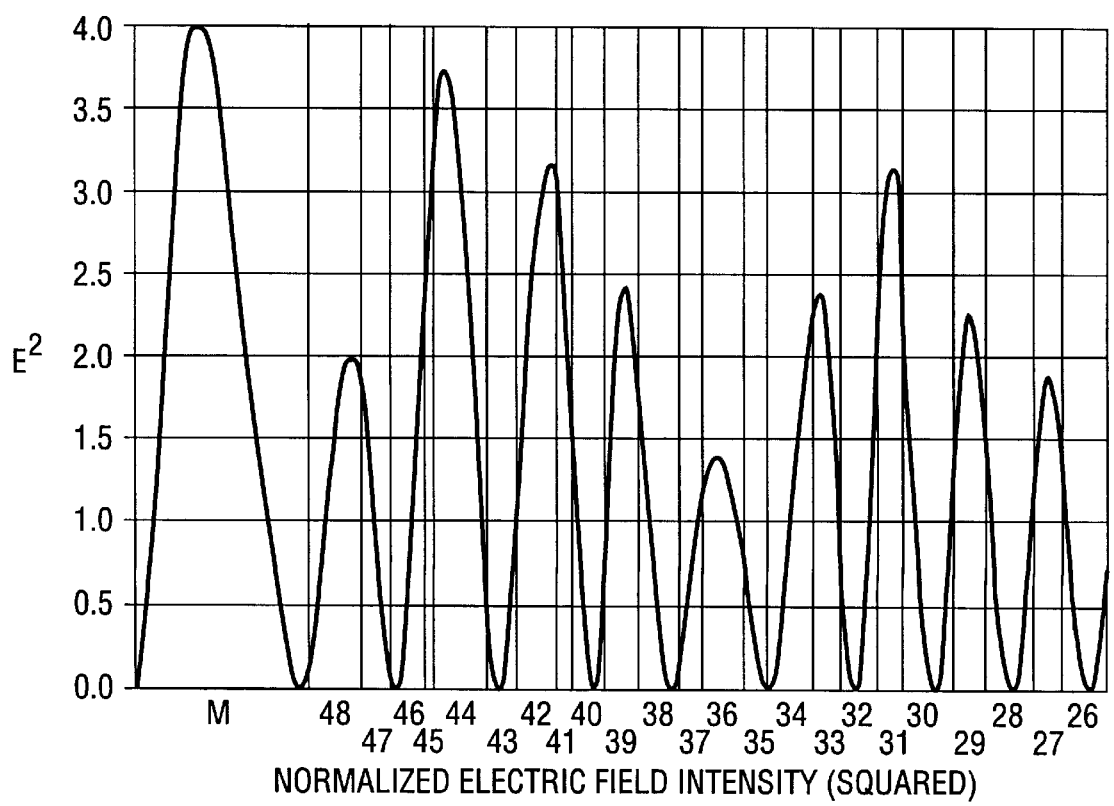

Beginning with an analysis of the front portion of structure 21, FIGS. 25A and 25B show electric field ($E^2$) distribution in layers 26–48 of the structure of FIG. 21 at wavelengths of respectively 950 nm and 1000 nm. Referring again to FIG. 21, there are actually five resonant (conjugate or virtual) cavities in this group of layers. Three of these cavities are clearly evident about layers 45, 41 and 37. Two others are slightly less evident around layers 33, and 31. The resonant effect of the latter two, however, is clearly evident from the electric field amplification caused thereby, as depicted in FIGS. 25A and 25B respectively.

Figure 26:
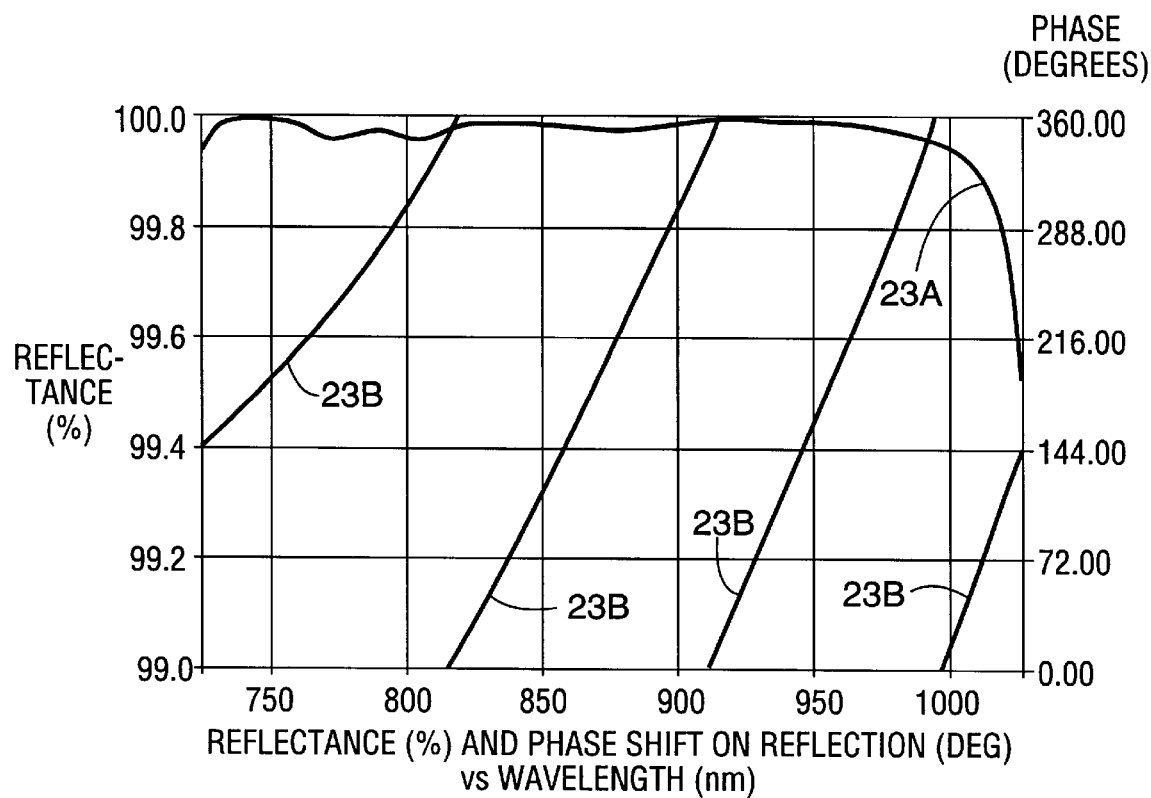
FIG. 26 is a graph schematically illustrating the computed reflection and phase-shift on reflection as a function of wavelength for the NGDD-mirror structure of FIG. 21.

Referring now to FIG. 26, the computed reflection (curve 23A) and phase-shift on reflection (curves 23B) as a function of wavelength for the NGDD-mirror structure of FIG. 21 are graphically depicted. The effect of the multiple resonant cavities of front portion of the structure of FIG. 21 are clearly evident in that the phase-shift on reflection varies by almost three cycles of 2 π (three cycles of 360°) within the above-mentioned reflection bandwidth, with, as would be expected, constantly increasing slope. Two slight reflection "dips" in curve 23A at about 770 nm and 800 nm should be noted. The cause of these dips is discussed further hereinbelow.

Figure 27:
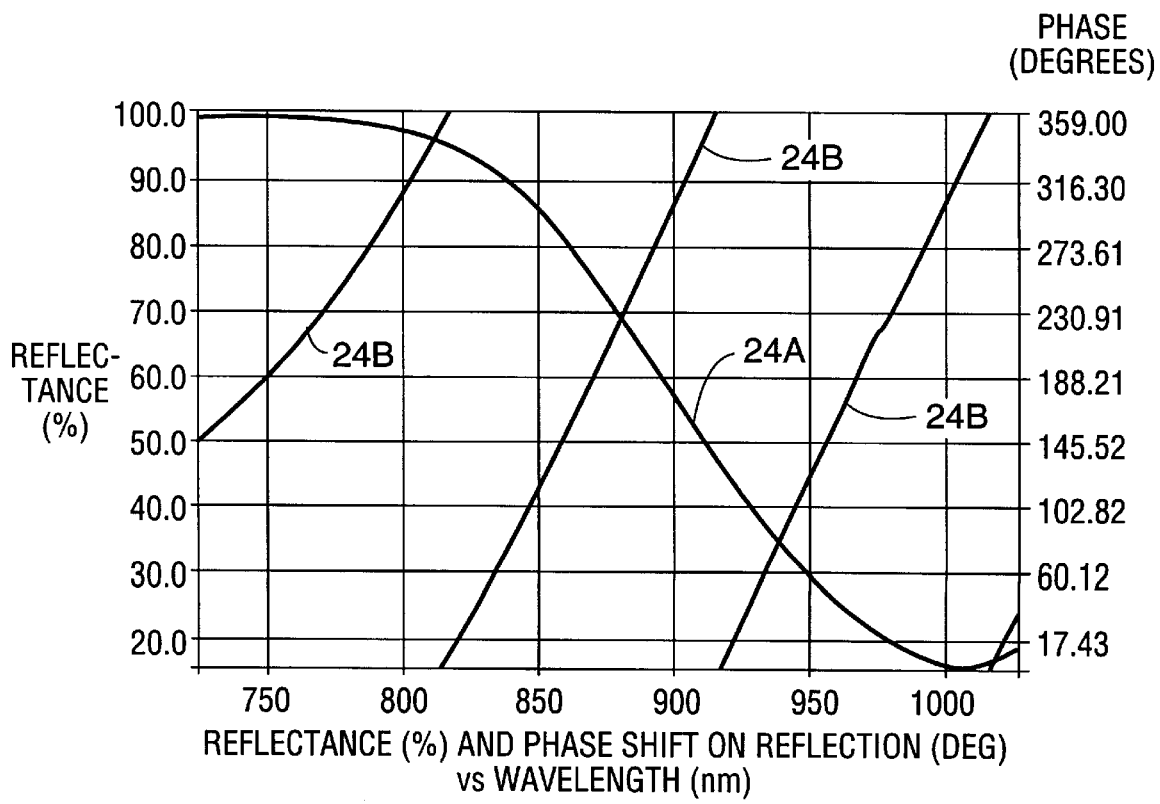
FIG. 27 is a graph schematically illustrating the computed reflection and phase-shift on reflection as a function of wavelength for front layers 28–48 alone of the NGDD-mirror structure of FIG. 21.

Referring now to FIG. 27, the computed reflection (curve 24A) and phase-shift on reflection (curves 24B) as a function of wavelength for the front portion (selected as layers 28–48) of the NGDD-mirror structure of FIG. 21 (as it would appear if deposited directly on a glass substrate) are graphically depicted. This front portion may be referred to as the phase-retarder portion or NGDD-portion. Two aspects of FIG. 27 are notable. First, reflection curve 24A transitions smoothly and slowly from a relatively low reflection value of less than 20% at about 1000 nm, only making substantial contribution (>90%) to reflectivity at wavelengths shorter than about 840 nm. This portion clearly provides the required almost-three-cycles of 2 π phase-shift. It should be noted, however, that the phase-shift-slope increases up to wavelengths of about 900 nm and then begins to decrease slightly.

Figure 28:
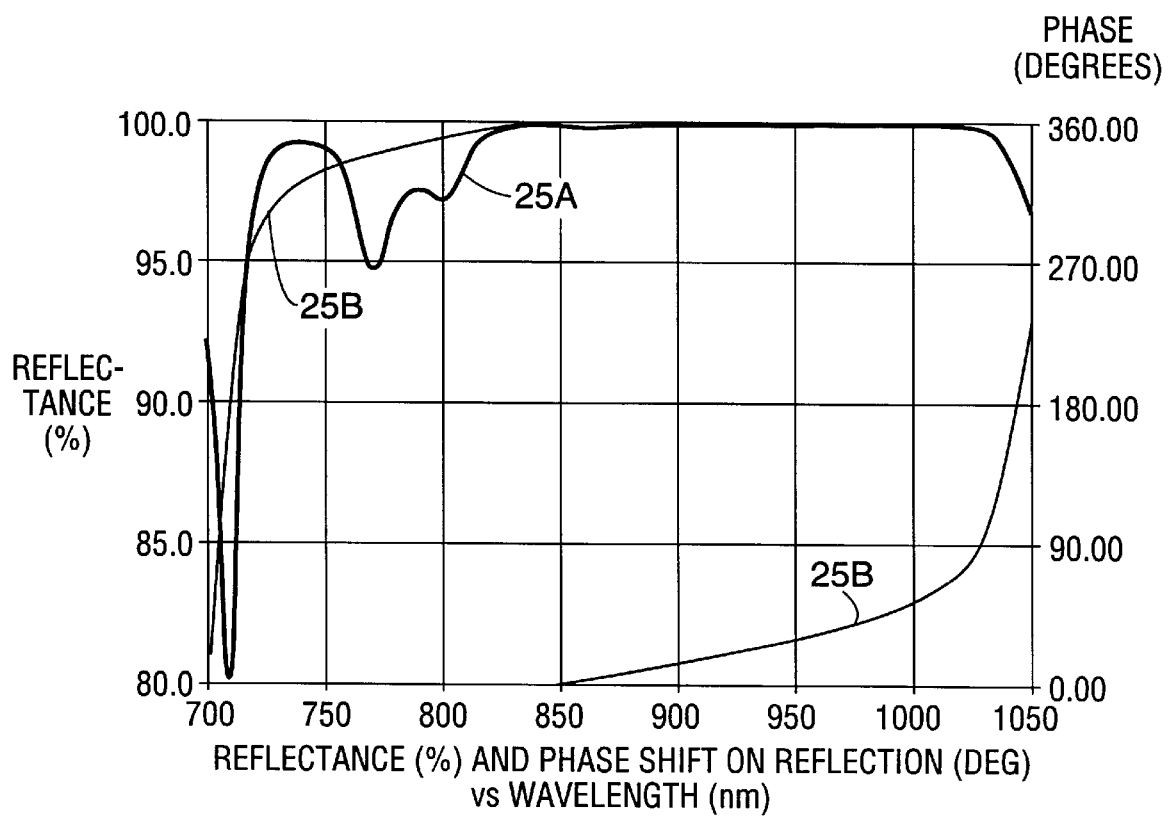
FIG. 28 is a graph schematically illustrating the computed reflection and phase-shift on reflection as a function of wavelength for rear layers 1–27 alone of the NGDD-mirror structure of FIG. 21.

Referring next to FIG. 28, the computed reflection (curve 25A) and phase-shift on reflection (curves 25B) as a function of wavelength for the rear portion (selected as layers 1–27) of the NGDD-mirror structure of FIG. 21, as it would appear if layers 28–48 were not deposited thereon. The following should be noted.

Comparing with FIG. 24, the phase-dispersion behaves in the same way as a "normal" quarter-wave stack but over a significantly wider bandwidth. From an abrupt change in slope at a short-wavelength band-extremity, phase-shift slope first gently decreases to about 0°/360° at 850 nm and then gently increases toward another abrupt change in slope beyond 1000 nm. It is effectively the combination of curves 24B of FIG. 27 and curves 25B of FIG. 28 which provide curves 23B of FIG. 26. The constant NGDD bandwidth limit results from the abrupt phase changes of this rear, mirror-portion of the structure of FIG. 18. In the optimization, the phase-form of the mirror portion is taken into account in structuring the phase-retarder portion.

Continuing with reference to FIG. 28, the reflection is generally high and at the required level across this bandwidth with the exception of a dip in reflection between about 750 and 820 nm. The dip in reflection in this region is, of course, mostly remedied by the short-wavelength contribution of phase-retarder layers 28–48, although, as noted above, traces are still observable in reflection curve 23A of FIG. 26.

This dip is an artifact of the bandwidth-broadening mechanism (and phase-broadening mechanism) for this mirror which, in this instance, is a multiple-resonant mechanism traceable to increased-thickness layers 3, 7, and 13 of this mirror portion of the structure of FIG. 21. Layers 3 7, and 13 have an optical thickness between about three-eighths and seven-eighths wavelength at some wavelength within the operative reflection band of the structure. This provides the above-noted reflection minima at 770 and 800 nm. Were one to examine the electric-field intensity distribution around layers 3, 7, and 13, one would find resonant amplification of the field, although, of course, the actual magnitude of the amplified field intensity would be about three, four, or more orders of magnitude less than in the resonant regions of the phase-retarder portion of the structure. When calculated from a direction opposite from the direction of intended use, i.e., as would be seen from the rear, reflection phase-change undergoes two cycles of 2 π in the region between about 750 to 820 nm characteristic of the resonant structure.

It is somewhat surprising and convenient that this rearward location of the thick layers can enable use of a resonant mechanism for reflection bandwidth broadening and at the same time smoothly extend the nearly flat phase-change region as seen from the direction of use without adversely affecting the NGDD performance of the mirror. In a simple test, it was found that reducing the increased thickness layers to about the same thickness as surrounding layers had the effect only of reducing the GDD and reflection bandwidth, the GDD in the reduced bandwidth remained essentially the same.

It is believed that "hiding" the band broadening substructure (for example layers 1–14) of the reflector portion of the structure of FIG. 21, (or any other broad-band mirror structure) "behind" a block of layers of about equal optical thickness (for example, layers 15–27 of FIG. 21), or in a block of layers generally gradually graded in optical thickness from front to back or vice-versa, but wherein any adjacent two layers has about equal optical thickness (for example, a difference less than 5%), is important in ensuring that the mirror or reflector portion of the inventive structure has the desired, smoothly-varying and relatively-flat phase-shift characteristic described above. Generally it will be found that the thinnest and thickest layers in such a graded block of layers have an optical thickness respectively greater than and less than about one quarter-wavelength at respectively the shortest and longest of the selected band of wavelengths for the NGDD-mirror.

This block or sub-structure of the broad-band mirror is of course (any interface layers aside) that block on which the phase-retarder structure is superposed. In an alternative definition, this block or sub-structure should not, itself, include any resonant sub-structure for wavelengths within the operative wavelength range of the mirror. Behind this sub-structure, depending on broadening required, there may be one or more spaced-apart layers having an optical thickness between about three eights and seven-eighths wavelength at a wavelength within the operative reflection band of the inventive NGDD-mirror with one or more layers therebetween having an optical thickness less that one quarter wavelength at a wavelength within the operative reflection band of the inventive NGDD-mirror.

It will be evident to those skilled in the art that this and other above described structures of NGDD-mirrors in accordance with the present invention provide considerable freedom in selecting reflectivity specifications and NGDD specifications, while not completely independently, in a only a loosely-coupled way. Certainly, knowledge of the which essential structural features are most important in controlling and defining particular ones of the mirror specifications is of great value in making sure that computer optimization provides as orderly as possible a structure for ease of manufacture. Having a prior knowledge of basic structural forms significantly reduces the time required, and the success percentage achieved, in computer optimizing such structures compared with methods taught in the prior art.

In this regard, having a knowledge of required characteristics of the mirror portion of the mirror function provides that a broad band NGDD mirror in accordance with the present invention can be designed in two separate steps. A first step would be to design a broad-band mirror portion by specifying a required phase characteristic as well as a reflectivity characteristic from a first initial structure. A second step would be adding to the broad band mirror structure, a sufficient number of layers including two or more resonant substructures arranged to provide a desired NGDD characteristic. A third step would be to optimizing the entire structure to meet required reflectivity and NGDD targets.

It should be noted that the inventive NGDD-mirrors, by virtue of the complex, multiple-resonant structure which is required to provide the exemplified magnitude and bandwidth of negative GDD, are sensitive to layer thickness errors. They can be expected to present the similar manufacturing challenges as other complex optically-resonant layer structures such as high-selectivity bandpass filters with multiple, coupled, resonant-cavities. In these inventive structures, however, by maintaining those layers which have limited ability to influence GDD or extend reflection or GDD bandwidth at near-equal thickness, and certainly by making sure that adjacent ones of these layers are as close in optical thickness as possible, this sensitivity can be significantly reduced compared with the prior-art Szipocs et al. structures. This is particularly true, for example, of structures of the type depicted in FIGS. 4, 12, and 14, wherein essentially all layers in a mirror portion of the structure have about equal optical thickness.

In examples of NGDD-mirror structures discussed above, initial structures have been optimized, which are formed from only two materials, one having a relatively high refractive index and the other a relatively low refractive index. Relatively high and low, here, being typical for essentially (low loss) materials transparent in the exemplified wavelength ranges. Optimization has been made against fixed NGDD and reflection parameters as might be specified for a particular laser device. One result of this, which is found in all such optimizations, is that in the nearly-constant NGDD band, there is a variation, or ripple, indicating third or higher order contributions of the phase-dispersion of the structures. In many applications, this rippling or lack of smoothness may be found adequate or tolerable. By introducing additional optimization variables, however, it may be possible to reduce the rippling, i.e., provide a more nearly-constant NGDD, albeit, in most instances, by adding structural complexity.

A simplest smoothing possibility, is to allow the GDD and reflection properties (magnitude and bandwidth) to be variable in a structure with a favored pair of materials and a fixed maximum number of layers (maximum, here, recognizing that even a purely thickness-varying optimization algorithm can reduce the number of layers by virtue of a zero-thickness option). This is simply trading greater NGDD-smoothness for lesser conformance with one or more other desired parameters and adds no complexity to the structure.

More complex, is to use the refractive index of layers, particularly in the phase-retarder portion of the structure, as an optimization variable. This can be done in a real or "simulated" way. Examples of this are set forth below.

In a first example, "real" index variation, the refractive index (simply) can be made an optimization variable. It should be noted here, however, that if the refractive index is significantly varied it may also be necessary to make additions to the number of layers in a particular localized group of layers in a structure. For example, in a structural group such as $(H/2\ L\ H/2)^2$ where H has the refractive index value 2.31 and L has the refractive index value 1.45, it may be necessary to change the sub-structure of the group itself to $(H/2\ L\ H/2)^3$ if the refractive index value of H is varied to 1.9. Those skilled in the art will be aware that there are optimization algorithms which allow layers to be automatically be added to a structure to reach a particular target. Alternatively, the group repetition number may be fixed and a third group (another virtual cavity) added. This, of course involves adding complexity at least by virtue of the number of layers. Adding layers in the phase-retarder section, however, may in itself be advantageous, as it provides more individual phase-components which can be summed to provide the phase (smooth NGDD) form required.

A significant restriction in index-variation is that useful "real" materials are typically available only in a limited range of refractive indices, with values not equally distributed throughout that range. Deposition of mixture of two materials may be used to at least partially overcome this restriction. This can add to manufacturing, if not structural complexity.

Adding layers and providing index variability can be simultaneously accomplished (manually), for example, by the technique of multilayer-group substitution for a single layer (preferably about a quarter-wave layer) in the phase-retarder group. Those skilled in the art will be aware that in one particular implementation of the technique, this involves (initially) substituting a combination of three layers for the single layer. The outermost of the layers may have a higher refractive index that the original layer, and the inner layer a lower refractive index, or vice-versa. The combination has about the same or somewhat lesser optical thickness than the single layer. The substitution adds boundaries which can be effective in NGDD optimization as well as providing a means of varying effective index of the substituted layer (by varying thickness of the component layers) with layers of preferred "real" materials.

Another technique which may be used for providing a structure for smoothing of NGDD consistent with principles of the present invention, is to optimize an initial or starting structure wherein, in the phase-retarder portion of the structure, one or more virtual cavities are formed, for example, by a conjugate layer-grouping of the form:

$$(aL\ bM\ cH\ bM\ aL)^n(aH\ bM\ cL\ bM\ aH)^n \quad (5)$$

where $2a+2b+c=2.0$ and M is a QWOT of a material having a refractive index intermediate that of H and L. Those skilled in the art will recognize that this technique may be extended to more complex repetition-groups including two or more intermediate index layer-pairs arranged in a graded fashion, or, in the limit, where each side of the conjugate grouping is a single periodic-inhomogeneous layer. This would be facilitated, of course, by optimization software able to optimize the index/thickness function of the layers.

Of course, any of the above-discussed variable options may be used alone or in combination for optimizing any particular parameter of an NGDD-mirror in accordance with the present invention. From the forgoing description, those skilled in the art may contemplate several such combinations of optimization or structural variables without departing from the spirit and scope of the present invention.

In all above-discussed examples of NGDD-mirrors in accordance with the present invention, structures have been designed with hypothetical materials which have neither dispersion nor loss. This is done in order to make a direct comparison of structural principles alone with analyzable prior-art approaches and between the examples themselves. In fact, were any of the above described structures to be re-optimized for an equivalent "real" material with a refractive index which varies across the operative bandwidth through dispersion, for example niobium oxide ($Nb_2O_5$) for index 2.31, and silicon dioxide ($SiO_2$) for index 1.45, there would be very little difference in the exemplary structures. What difference would exist would be a slight departure, for example about 1%, from exact equality of those layers which are exemplified as exactly equal in optical thickness, and some comparable difference in thickness of corresponding layers in the phase-retarder portions and bandwidth/phase-broadening portions.

Regarding zero loss, using a low-loss deposition technique, particularly ion-beam sputtering, can provide losses-per-layer sufficiently low that they have no distinguishable effect on form or function the inventive structures. By way of example, using ion-beam-sputter-deposited layers of certain high- refractive-index materials such as tantalum oxide ($Ta_2O_5$) or hafnium oxide ($HfO_2$), and a low refractive index material such as $SiO_2$, a total optical loss less than about $5\times10^{-5}$ (0.005%) may be obtained for a stack of about forty, or even more, alternating layers.

In all above-discussed examples of NGDD-mirrors in accordance with the present invention, structures have been optimized for use with light (radiation) incident normally thereon, and the optical thickness of layers is the optical thickness at that (normal) angle of incidence. Again, this is done in order to make a direct comparison of structural principles alone with analyzable prior-art approaches and between the examples themselves. Principles of the present invention are equally applicable, however, if structures are designed for use at non-normal incidence. Corresponding structures may be similarly defined in optical thickness terms given that optical thickness is the effective optical thickness for a particular polarization orientation, at the angle-of-incidence of intended use.

In certain instances, there could be some advantage to designing structures for use at a relatively high incidence angle, for example, about 45°, and for light polarized perpendicular to the plane of incidence (s-polarized). This has been done with prior-art NGDD devices, such as the Gires-Tournois interferometer, to extend the bandwidth of the device.

An advantage of designing for s-polarized light is that for a given pair of materials (a high and a low refractive index material), the effective index-ratio for the s-polarized light increases with increasing angle of incidence. This means that the above-discussed "normal" reflection bandwidth for these materials increases. Those familiar with the art will recognize that the individual effective-indices actually decrease. This can be advantage in exploiting some of the above-discussed smoothing options, inasmuch as the angle of incidence can provide effective-index variation with preferred "real" materials.

Further, a relatively low-index-ratio material-pair, for example $HfO_2$ and $SiO_2$, at some practical angle of incidence, will have the same index-ratio as, say, $Nb_2O_5$ and $SiO_2$ at normal incidence. At this incidence-angle $Nb_2O_5$ would be effective as a material with significantly higher refractive index at normal incidence. The principles of non-normal incidence layer system design are well-known to those skilled in the art and a further more detailed description of applying the inventive principles is not necessary. Accordingly, no specific examples of the inventive NGDD-mirrors at non-normal incidence are presented herein.

Throughout the above-presented description, examples of NGDD mirror structures in accordance with the present invention have been presented with reference to wavelength-dependent functions for parameters such as reflectivity, NGDD and reflective phase-shift, as such are common in the art to which the present invention generally pertains. Those skilled in the art will recognize that the principles of the present invention are equally applicable if a wavelength related parameter such as frequency, energy, wavenumber or relative-wavenumber is selected for specifying those parameters.

The present invention has been described and depicted as a preferred and other embodiments. The invention is not limited, however, to those embodiments described and depicted. Rather, the invention is defined by the claims appended hereto.

What is claimed is:

1. A multilayer mirror for providing greater than a selected high reflectivity value and substantially-constant negative group-delay-dispersion over a selected band of wavelengths, comprising:

a substrate;

first and second pluralities of layers disposed on said substrate, with said second plurality of layers superposed on said first plurality of layers;

said first plurality of layers functioning primarily to provide said high reflectivity; and said second plurality of layers arranged such that selective resonant trapping of wavelengths within the band of wavelengths occurs in at least two longitudinally spaced-apart cavity groups of one or more layers within said second plurality of layers in such a way that said second plurality of layers functions primarily to provide a high reflection phase-dispersion for the mirror within the selected band of wavelengths and, cooperative with said first plurality of layers, to provide that said reflection phase-dispersion constantly increases over the selected band of wavelengths from about the shortest wavelength thereof to about the longest wavelength thereof, in a way which provides the substantially-constant negative group-delay-dispersion across the selected band of wavelengths.

2. The mirror of claim 1, wherein layers in said first and second pluralities are layers of materials transparent to said selected band of wavelengths, and adjacent layers have a different refractive index.

3. The mirror of claim 2, wherein said first plurality of layers further includes a metal layer, said metal layer being closest to said substrate.

4. The mirror of claim 2, wherein said substrate is a metal substrate having a polished surface on which said first and second pluralities of layers are deposited.

5. The mirror of claim 1, wherein said first plurality of layers is essentially a stack of alternating high and low refractive index dielectric materials, each thereof having an optical thickness of about one-quarter wavelength at wavelength within the selected range of wavelengths.

6. The mirror of claim 1, wherein each of said cavity-groups includes at least one layer having an optical thickness less than about one-quarter wavelength at a wavelength within the selected band of wavelengths.

7. The mirror of claim 1 wherein at least one of said cavity groups has an optical thickness of about one-half wavelength at a wavelength within the selected band of wavelengths.

8. A multilayer mirror for providing greater than a selected high reflectivity value and a substantially-constant negative group-delay-dispersion over a selected band of wavelengths, comprising:

a substrate;

first and second pluralities of layers disposed on said substrate, with said second plurality of layers superposed on said first plurality of layers;

said first plurality of layers functioning primarily to provide said high reflectivity and being essentially a quarter-wave stack of layers having about equal optical thickness, said optical thickness being about one-quarter wavelength at a wavelength within the selected band of wavelengths; and said second plurality of layers arranged such that selective resonant trapping of wavelengths within the band of wavelengths occurs in at least two longitudinally spaced-apart cavity groups of one or more layers within said second plurality of layers in such a way that said second plurality of layers functions primarily to provide a high reflection phase-dispersion for the mirror within the selected band of wavelengths and, cooperative with said first plurality of layers, to provide that said reflection phase-dispersion constantly increases over the selected band of wavelengths from about the shortest wavelength thereof to about the longest wavelength thereof, in a way which provides the substantially-constant negative group-delay-dispersion across the band of wavelengths.

9. A multilayer mirror for providing greater than a selected high reflectivity value and a substantially-constant negative group-delay-dispersion over a selected band of wavelengths, comprising:

a substrate;

first and second pluralities of layers disposed on said substrate, with said second plurality of layers superposed on said first plurality of layers;

said first plurality of layers being alternating layers of a first material having a high refractive index and a second material having a low refractive index, said layers arranged to form a mirror having a reflection band at least as wide as the selected band of wavelengths and greater than a correspondingly-defined reflection band of a quarter-wave stack of said first and second materials; and said second plurality of layers arranged such that selective resonant trapping of wavelengths within the band of wavelengths occurs in at least two longitudinally spaced-apart cavity groups of one or more layers within said second plurality of layers, each of said cavity groups including at least one layer having an optical thickness less than one quarter-wavelength optical thickness at a wavelength within the selected band of wavelengths, said selective resonant trapping occurring in such a way that said second plurality of layers functions primarily to provide a high reflection phase-dispersion for the mirror within the selected band of wavelengths and, cooperative with said first plurality of layers, to provide that said reflection phase-dispersion constantly increases over the selected band of wavelengths from about the shortest wavelength thereof to about the longest wavelength thereof, in a way which provides substantially-constant negative group-delay-dispersion across the band of wavelengths.

10. The mirror of claim 9, wherein said first plurality of layers includes first and second portions, said second portion furthest from said substrate and characterized in that all adjacent layer pairs therein have about the same optical thickness and wherein said first portion includes two or more spaced-apart layers having an optical thickness of between about three-eighths and seven-eighths of a wavelength at a wavelength within said selected band of wavelengths.

11. The mirror of claim 10, wherein all layers in said first portion of said first plurality of layers each have an optical thickness of about one-quarter wavelength at a wavelength within the selected band of wavelengths.

12. The mirror of claim 11, wherein said two or more spaced-apart layers having an optical thickness of between about three-eighths and seven-eighths of a wavelength at a wavelength within the selected band of wavelengths are spaced apart by layers having an optical thickness of about one-quarter wavelength at a wavelength within the selected band of wavelengths.

13. The mirror of claim 11, wherein between said two or more spaced-apart layers having an optical thickness of between about three-eighths and seven-eighths of a wavelength at a wavelength within the selected band of wavelengths are layers having an optical thickness less than about one-quarter wavelength at a wavelength within the selected band of wavelengths.

14. The mirror of claim 10, wherein adjacent ones of said second plurality of layers have a different refractive index and any one layer is a layer of a material having one of a high refractive index, a low refractive index, and a refractive index intermediate said high and low refractive indices.

15. A multilayer mirror for providing greater than a selected high reflectivity value and a substantially-constant negative group-delay-dispersion over a selected band of wavelengths in an intended direction of light incidence thereon, comprising:

a substrate;

first and second pluralities of layers disposed on said substrate, with said second plurality of layers superposed on said first plurality of layers;

said first plurality of layers functioning primarily to provide said high reflectivity value and including alternating layers of a material having a high refractive index and a material having a low refractive index, said layers arranged to form a mirror having a reflection band at least as wide as the selected band of wavelengths, and wherein said first plurality of layers alone, seen in the intended light-incidence direction of the mirror would have a phase-dispersion defined as reflection phase-shift as a function of wavelength varying by no greater than $\pi/2$ over said selected band of wavelengths, the form of said reflection-phase-shift function being smoothly and monotonically varying, said high and low index values of said first plurality of layers being such that a quarter-wave-stack of such layers having a center wavelength within said selected band of wavelengths would have a bandwidth about equal to or less than the selected band of wavelengths; and said second plurality of layers arranged such that selective resonant trapping of wavelengths within the band of wavelengths occurs in at least two longitudinally spaced-apart cavity groups of one or more layers within said second plurality of layers, each of said cavity groups including at least one layer having an optical thickness less than one quarter-wavelength optical thickness at a wavelength within the selected band of wavelengths, said selective resonant trapping occurring in such a way that said second plurality of layers functions primarily to provide a high reflection phase-dispersion for the mirror within the selected band of wavelengths and, cooperative with said first plurality of layers, to provide that said reflection phase-dispersion constantly increases over the selected band of wavelengths from about the shortest wavelength thereof to about the longest wavelength thereof, in a way which provides substantially-constant negative group-delay-dispersion across the selected band of wavelengths.

16. The mirror of claim 15, wherein said high phase-dispersion created by said second plurality of players is greater than about $\pi$ over the selected band of wavelengths.

17. The mirror of claim 15, wherein said second plurality of wavelengths includes alternating layers of a high refractive index material and a low refractive index material.

18. The mirror of claim 17, wherein said high and low refractive index materials of said second plurality of layers are respectively the same as said high and low refractive index materials of said first plurality of layers.

* * * * *